United States Patent
Chemel et al.

(10) Patent No.: US 9,510,426 B2
(45) Date of Patent: Nov. 29, 2016

(54) METHODS, SYSTEMS, AND APPARATUS FOR INTELLIGENT LIGHTING

(71) Applicant: Digital Lumens Incorporated, Boston, MA (US)

(72) Inventors: Brian Chemel, Marblehead, MA (US); John F. Egan, Middleton, MA (US); Scott D. Johnston, Boston, MA (US); Steve T. Kondo, Malden, MA (US); Jesse F. Kuhn, Somerville, MA (US); Matthew W. Massicotte, Quincy, MA (US); Frederick M. Morgan, Canton, MA (US); Colin N. Piepgras, Swampscott, MA (US); Henry B. Sick, Brighton, MA (US); Christopher L. Elledge, Arlington, MA (US)

(73) Assignee: Digital Lumens, Inc., Boston, MA (US)

( * ) Notice: Subject to any disclaimer, the term of this patent is extended or adjusted under 35 U.S.C. 154(b) by 0 days.

(21) Appl. No.: 14/267,386

(22) Filed: May 1, 2014

(65) Prior Publication Data
US 2014/0292208 A1    Oct. 2, 2014

Related U.S. Application Data

(63) Continuation of application No. PCT/US2012/063372, filed on Nov. 2, 2012.

(60) Provisional application No. 61/555,075, filed on Nov. 3, 2011, provisional application No. 61/577,354, filed on Dec. 19, 2011.

(51) Int. Cl.
*H05B 37/02* (2006.01)
*H05B 33/08* (2006.01)

(52) U.S. Cl.
CPC .......... *H05B 37/02* (2013.01); *H05B 33/0854* (2013.01); *H05B 37/0218* (2013.01); *H05B 37/0227* (2013.01); *Y02B 20/46* (2013.01); *Y02B 20/48* (2013.01)

(58) Field of Classification Search
CPC .......... H05B 33/0803; H05B 33/0806; H05B 33/0815; H05B 33/0827; H05B 33/0842; H05B 33/0845; H05B 33/0869; H05B 37/029

USPC .................. 315/297, 291, 224, 85, 154, 340
See application file for complete search history.

(56) References Cited

U.S. PATENT DOCUMENTS

| | | |
|---|---|---|
| 2,899,541 A | 8/1957 | De Mauro |
| D185,410 S | 6/1959 | Bodian |

(Continued)

FOREIGN PATENT DOCUMENTS

| | | |
|---|---|---|
| CN | 1873908 A | 12/2006 |
| JP | 2005-073133 | 3/1993 |

(Continued)

OTHER PUBLICATIONS

Garg, Visha et al., "Smart occupancy sensors to reduce energy consumption, Energy and Buildings," vol. 32, Issue 1, Jun. 2000, pp. 81-87. ISSN 0378-7788, 10.1 016/S0378-7788(99)00040-7. (http://www.sciencedirect.com/science/article/pii/S037877889.

(Continued)

*Primary Examiner* — Douglas W Owens
*Assistant Examiner* — Syed M Kaiser
(74) *Attorney, Agent, or Firm* — Cooley LLP

(57) ABSTRACT

An ambient light sensor measures an ambient light level at one point in an illuminated environment, such as a warehouse, office, shop, cold-storage facility, or industrial facility, and provides an indication of the measured ambient light level to a processor. The processor maps the measured ambient light level to an estimated ambient light level at a different point in the illuminated environment from the measured ambient light level (e.g., a "task height" about three feet from a warehouse floor). The processor may determine the difference between the estimated ambient light level and a desired light level at the task height, and may change the artificial illumination provided by a light fixture to make the actual ambient light level at task height match the desired light level at the task height.

35 Claims, 12 Drawing Sheets

(56) References Cited

U.S. PATENT DOCUMENTS

| | | |
|---|---|---|
| D191,530 S | 10/1961 | Zurawski |
| D200,548 S | 3/1965 | Reeves |
| 4,194,181 A | 3/1980 | Brundage |
| 4,217,646 A | 8/1980 | Caltagirone et al. |
| 4,277,691 A | 7/1981 | Lunn |
| 4,298,922 A | 11/1981 | Hardwick |
| 4,558,275 A | 12/1985 | Borowy et al. |
| 4,755,920 A | 7/1988 | Tinley |
| 4,772,825 A | 9/1988 | Tabor et al. |
| 4,780,731 A | 10/1988 | Creutzmann et al. |
| D300,471 S | 3/1989 | Szymanek |
| 4,873,469 A | 10/1989 | Young et al. |
| 5,055,985 A | 10/1991 | Fabbri |
| 5,144,222 A | 9/1992 | Herbert |
| 5,323,334 A | 6/1994 | Meyers et al. |
| 5,430,356 A | 7/1995 | Ference et al. |
| 5,455,487 A | 10/1995 | Mix et al. |
| 5,521,852 A | 5/1996 | Hibbs et al. |
| 5,521,853 A | 5/1996 | Hibbs et al. |
| D374,301 S | 10/1996 | Kleffman |
| 5,566,084 A | 10/1996 | Cmar |
| 5,572,237 A | 11/1996 | Crooks et al. |
| 5,572,239 A | 11/1996 | Jaeger |
| 5,640,792 A | 6/1997 | Smith et al. |
| 5,655,833 A | 8/1997 | Raczynski |
| 5,668,446 A | 9/1997 | Baker |
| 5,739,639 A | 4/1998 | Johnson |
| 5,753,983 A | 5/1998 | Dickie et al. |
| 5,764,146 A | 6/1998 | Baldwin et al. |
| 5,895,986 A | 4/1999 | Walters et al. |
| 5,914,865 A | 6/1999 | Barbehenn et al. |
| 5,945,993 A | 8/1999 | Fleischmann |
| 5,971,597 A | 10/1999 | Baldwin et al. |
| 6,016,038 A | 1/2000 | Mueller et al. |
| 6,025,679 A | 2/2000 | Harper et al. |
| 6,028,396 A | 2/2000 | Morrissey, Jr. et al. |
| 6,028,597 A | 2/2000 | Ryan et al. |
| 6,035,266 A | 3/2000 | Williams et al. |
| 6,092,913 A | 7/2000 | Edwards, Jr. |
| 6,097,419 A | 8/2000 | Morris et al. |
| 6,113,137 A | 9/2000 | Mizutani et al. |
| 6,118,230 A | 9/2000 | Fleischmann |
| 6,150,774 A | 11/2000 | Mueller et al. |
| 6,151,529 A | 11/2000 | Batko |
| 6,160,359 A | 12/2000 | Fleischmann |
| 6,166,496 A | 12/2000 | Lys et al. |
| 6,211,626 B1 | 4/2001 | Lys et al. |
| 6,257,735 B1 | 7/2001 | Baar |
| D447,266 S | 8/2001 | Verfuerth |
| 6,292,901 B1 | 9/2001 | Lys et al. |
| 6,340,868 B1 | 1/2002 | Lys et al. |
| 6,359,555 B1 | 3/2002 | Williams |
| 6,370,489 B1 | 4/2002 | Williams et al. |
| D457,667 S | 5/2002 | Piepgras et al. |
| D457,669 S | 5/2002 | Piepgras et al. |
| D457,974 S | 5/2002 | Piepgras et al. |
| 6,384,722 B1 | 5/2002 | Williams |
| 6,388,399 B1 | 5/2002 | Eckel et al. |
| 6,393,381 B1 | 5/2002 | Williams et al. |
| D458,395 S | 6/2002 | Piepgras et al. |
| D460,735 S | 7/2002 | Verfuerth |
| 6,415,205 B1 | 7/2002 | Myron et al. |
| 6,415,245 B2 | 7/2002 | Williams et al. |
| 6,428,183 B1 | 8/2002 | McAlpin |
| D463,059 S | 9/2002 | Verfuerth |
| D463,610 S | 9/2002 | Piepgras et al. |
| 6,452,339 B1 | 9/2002 | Morrissey et al. |
| 6,452,340 B1 | 9/2002 | Morrissey, Jr. et al. |
| 6,456,960 B1 | 9/2002 | Williams et al. |
| 6,459,919 B1 | 10/2002 | Lys et al. |
| 6,466,190 B1 | 10/2002 | Evoy |
| 6,467,933 B2 | 10/2002 | Baar |
| 6,486,790 B1 | 11/2002 | Perlo et al. |
| D468,035 S | 12/2002 | Blanc et al. |
| 6,491,412 B1 | 12/2002 | Bowman et al. |
| 6,517,218 B2 | 2/2003 | Hochstein |
| 6,528,954 B1 | 3/2003 | Lys et al. |
| 6,548,967 B1 | 4/2003 | Dowling et al. |
| 6,577,080 B2 | 6/2003 | Lys et al. |
| 6,585,396 B1 | 7/2003 | Verfuerth |
| 6,604,062 B2 | 8/2003 | Williams et al. |
| 6,608,453 B2 | 8/2003 | Morgan et al. |
| D479,826 S | 9/2003 | Verfuerth et al. |
| 6,624,597 B2 | 9/2003 | Dowling et al. |
| 6,641,284 B2 | 11/2003 | Stopa et al. |
| 6,652,119 B1 | 11/2003 | Barton |
| D483,332 S | 12/2003 | Verfuerth |
| 6,710,588 B1 | 3/2004 | Verfuerth et al. |
| 6,714,895 B2 | 3/2004 | Williams et al. |
| 6,717,376 B2 | 4/2004 | Lys et al. |
| 6,720,745 B2 | 4/2004 | Lys et al. |
| 6,724,180 B1 | 4/2004 | Verfuerth et al. |
| D491,678 S | 6/2004 | Piepgras |
| D492,042 S | 6/2004 | Piepgras |
| 6,746,274 B1 | 6/2004 | Verfuerth |
| 6,748,299 B1 | 6/2004 | Motoyama |
| 6,758,580 B1 | 7/2004 | Verfuerth |
| D494,700 S | 8/2004 | Hartman et al. |
| 6,774,584 B2 | 8/2004 | Lys et al. |
| 6,774,619 B1 | 8/2004 | Verfuerth et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,791,458 B2 | 9/2004 | Baldwin |
| 6,798,341 B1 | 9/2004 | Eckel et al. |
| 6,801,003 B2 | 10/2004 | Schanberger et al. |
| 6,806,659 B1 | 10/2004 | Mueller et al. |
| 6,807,516 B2 | 10/2004 | Williams et al. |
| 6,841,944 B2 | 1/2005 | Morrissey et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,892,168 B2 | 5/2005 | Williams et al. |
| 6,909,921 B1 | 6/2005 | Bilger |
| 6,933,627 B2 | 8/2005 | Wilhelm |
| 6,936,978 B2 | 8/2005 | Morgan et al. |
| 6,964,502 B1 | 11/2005 | Verfuerth |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,002,546 B1 | 2/2006 | Stuppi et al. |
| D518,218 S | 3/2006 | Roberge et al. |
| 7,014,336 B1 | 3/2006 | Ducharme et al. |
| 7,019,276 B2 | 3/2006 | Cloutier et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,062,360 B2 | 6/2006 | Fairlie et al. |
| 7,064,498 B2 | 6/2006 | Dowling et al. |
| 7,093,952 B2 | 8/2006 | Ono et al. |
| 7,113,541 B1 | 9/2006 | Lys et al. |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,160,140 B1 | 1/2007 | Mrakovich et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| D538,462 S | 3/2007 | Verfuerth et al. |
| 7,186,003 B2 | 3/2007 | Dowling et al. |
| 7,187,141 B2 | 3/2007 | Mueller et al. |
| 7,190,121 B2 | 3/2007 | Rose et al. |
| 7,199,531 B2 | 4/2007 | Loughrey |
| 7,202,613 B2 | 4/2007 | Morgan et al. |
| 7,204,622 B2 | 4/2007 | Dowling et al. |
| 7,220,015 B2 | 5/2007 | Dowling |
| 7,220,018 B2 | 5/2007 | Crabb et al. |
| 7,221,104 B2 | 5/2007 | Lys et al. |

(56) References Cited

U.S. PATENT DOCUMENTS

| | | |
|---|---|---|
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,256,556 B2 | 8/2007 | Lane et al. |
| 7,274,160 B2 | 9/2007 | Mueller et al. |
| 7,274,975 B2 | 9/2007 | Miller |
| 7,300,192 B2 | 11/2007 | Mueller et al. |
| D557,817 S | 12/2007 | Verfuerth et al. |
| 7,303,300 B2 | 12/2007 | Dowling et al. |
| 7,308,296 B2 | 12/2007 | Lys et al. |
| 7,309,965 B2 | 12/2007 | Dowling et al. |
| 7,311,423 B2 | 12/2007 | Frecska et al. |
| D560,469 S | 1/2008 | Bartol et al. |
| D562,494 S | 2/2008 | Piepgras |
| 7,333,903 B2 | 2/2008 | Walters et al. |
| 7,344,279 B2 | 3/2008 | Mueller et al. |
| 7,344,296 B2 | 3/2008 | Matsui et al. |
| 7,348,736 B2 | 3/2008 | Piepgras et al. |
| D566,323 S | 4/2008 | Piepgras et al. |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,929 B2 | 4/2008 | Mueller et al. |
| 7,385,359 B2 | 6/2008 | Dowling et al. |
| 7,387,405 B2 | 6/2008 | Ducharme et al. |
| 7,391,335 B2 | 6/2008 | Mubaslat et al. |
| 7,401,942 B1 | 7/2008 | Verfuerth et al. |
| 7,411,489 B1 | 8/2008 | Elwell et al. |
| 7,427,840 B2 | 9/2008 | Morgan et al. |
| 7,445,354 B2 | 11/2008 | Aoki et al. |
| 7,453,217 B2 | 11/2008 | Lys et al. |
| 7,470,055 B2 | 12/2008 | Hacker et al. |
| 7,482,565 B2 | 1/2009 | Morgan et al. |
| 7,482,764 B2 | 1/2009 | Morgan et al. |
| 7,495,671 B2 | 2/2009 | Chemel et al. |
| 7,501,768 B2 | 3/2009 | Lane et al. |
| 7,502,034 B2 | 3/2009 | Chemel et al. |
| 7,506,993 B2 | 3/2009 | Kain et al. |
| 7,507,001 B2 | 3/2009 | Kit |
| 7,518,319 B2 | 4/2009 | Konno et al. |
| 7,520,634 B2 | 4/2009 | Ducharme et al. |
| 7,529,594 B2 | 5/2009 | Walters et al. |
| D593,697 S | 6/2009 | Liu et al. |
| 7,543,956 B2 | 6/2009 | Piepgras et al. |
| 7,546,167 B2 | 6/2009 | Walters et al. |
| 7,546,168 B2 | 6/2009 | Walters et al. |
| 7,550,931 B2 | 6/2009 | Lys et al. |
| 7,550,935 B2 | 6/2009 | Lys et al. |
| D595,894 S | 7/2009 | Verfuerth et al. |
| 7,563,006 B1 | 7/2009 | Verfuerth et al. |
| 7,571,063 B2 | 8/2009 | Howell et al. |
| 7,572,028 B2 | 8/2009 | Mueller et al. |
| 7,575,338 B1 | 8/2009 | Verfuerth |
| 7,598,681 B2 | 10/2009 | Lys et al. |
| 7,598,684 B2 | 10/2009 | Lys et al. |
| 7,598,686 B2 | 10/2009 | Lys et al. |
| 7,603,184 B2 | 10/2009 | Walters et al. |
| 7,619,370 B2 | 11/2009 | Chemel et al. |
| D606,697 S | 12/2009 | Verfuerth et al. |
| D606,698 S | 12/2009 | Verfuerth et al. |
| 7,628,506 B2 | 12/2009 | Verfuerth et al. |
| 7,638,743 B2 | 12/2009 | Bartol et al. |
| 7,642,730 B2 | 1/2010 | Dowling et al. |
| 7,646,029 B2 | 1/2010 | Mueller et al. |
| 7,659,674 B2 | 2/2010 | Mueller et al. |
| 7,660,892 B2 | 2/2010 | Choong et al. |
| 7,703,951 B2 | 4/2010 | Piepgras et al. |
| D617,028 S | 6/2010 | Verfuerth et al. |
| D617,029 S | 6/2010 | Verfuerth et al. |
| 7,744,251 B2 | 6/2010 | Liu et al. |
| 7,746,003 B2 | 6/2010 | Verfuerth et al. |
| 7,753,568 B2 | 7/2010 | Hu et al. |
| 7,761,260 B2 | 7/2010 | Walters et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,766,518 B2 | 8/2010 | Piepgras et al. |
| 7,777,427 B2 | 8/2010 | Stalker, III |
| 7,780,310 B2 | 8/2010 | Verfuerth et al. |
| 7,783,390 B2 | 8/2010 | Miller |
| 7,784,966 B2 | 8/2010 | Verfuerth et al. |
| D623,340 S | 9/2010 | Verfuerth et al. |
| 7,792,956 B2 | 9/2010 | Choong et al. |
| 7,809,448 B2 | 10/2010 | Lys et al. |
| 7,824,065 B2 | 11/2010 | Maxik |
| 7,828,465 B2 | 11/2010 | Roberge et al. |
| 7,839,017 B2 | 11/2010 | Huizenga et al. |
| 7,839,295 B2 | 11/2010 | Ries, II |
| 7,845,823 B2 | 12/2010 | Mueller et al. |
| 7,852,017 B1 * | 12/2010 | Melanson ..................... 315/291 |
| 7,866,847 B2 | 1/2011 | Zheng |
| D632,006 S | 2/2011 | Verfuerth et al. |
| D632,418 S | 2/2011 | Bisberg et al. |
| 7,878,683 B2 | 2/2011 | Logan et al. |
| 7,911,359 B2 | 3/2011 | Walters et al. |
| 7,924,155 B2 | 4/2011 | Soccoli et al. |
| 7,925,384 B2 | 4/2011 | Huizenga et al. |
| 7,926,974 B2 | 4/2011 | Wung et al. |
| 7,936,561 B1 | 5/2011 | Lin |
| 7,938,558 B2 | 5/2011 | Wilcox et al. |
| 7,959,320 B2 | 6/2011 | Mueller et al. |
| 7,962,606 B2 | 6/2011 | Barron et al. |
| 7,976,188 B2 | 7/2011 | Peng |
| 7,988,335 B2 | 8/2011 | Liu et al. |
| 7,988,341 B2 | 8/2011 | Chen |
| 7,997,762 B2 | 8/2011 | Wang et al. |
| 8,010,319 B2 | 8/2011 | Walters et al. |
| 8,013,281 B2 | 9/2011 | Morgan et al. |
| 8,025,426 B2 | 9/2011 | Mundle et al. |
| 8,033,686 B2 | 10/2011 | Recker et al. |
| 8,035,320 B2 | 10/2011 | Sibert |
| 8,042,968 B2 | 10/2011 | Boyer et al. |
| 8,052,301 B2 | 11/2011 | Zhou et al. |
| 8,061,865 B2 | 11/2011 | Piepgras et al. |
| 8,066,403 B2 | 11/2011 | Sanfilippo et al. |
| 8,067,906 B2 | 11/2011 | Null |
| D650,225 S | 12/2011 | Bartol et al. |
| 8,070,312 B2 | 12/2011 | Verfuerth et al. |
| 8,079,731 B2 | 12/2011 | Lynch et al. |
| 8,080,819 B2 | 12/2011 | Mueller et al. |
| 8,096,679 B2 | 1/2012 | Chen et al. |
| 8,101,434 B2 | 1/2012 | Guillien et al. |
| 8,136,958 B2 | 3/2012 | Verfuerth et al. |
| 8,138,690 B2 | 3/2012 | Chemel et al. |
| 8,147,267 B2 | 4/2012 | Oster |
| RE43,456 E | 6/2012 | Verfuerth et al. |
| 8,214,061 B2 | 7/2012 | Westrick, Jr. et al. |
| 8,232,745 B2 | 7/2012 | Chemel et al. |
| 8,237,581 B2 | 8/2012 | Ries, II |
| 8,237,582 B2 | 8/2012 | Ries, II |
| 8,242,927 B2 | 8/2012 | Ries, II |
| 8,260,575 B2 | 9/2012 | Walters et al. |
| 8,265,674 B2 | 9/2012 | Choong et al. |
| 8,275,471 B2 | 9/2012 | Huizenga et al. |
| 8,337,043 B2 | 12/2012 | Verfuerth et al. |
| 8,339,069 B2 | 12/2012 | Chemel et al. |
| 8,344,660 B2 | 1/2013 | Mohan et al. |
| 8,344,665 B2 | 1/2013 | Verfuerth et al. |
| 8,364,325 B2 | 1/2013 | Huizenga et al. |
| 8,368,321 B2 | 2/2013 | Chemel et al. |
| 8,370,483 B2 | 2/2013 | Choong et al. |
| 8,373,362 B2 | 2/2013 | Chemel et al. |
| 8,376,583 B2 | 2/2013 | Wang et al. |

(56) References Cited

U.S. PATENT DOCUMENTS

| | | |
|---|---|---|
| 8,376,600 B2 | 2/2013 | Bartol et al. |
| 8,406,937 B2 | 3/2013 | Verfuerth et al. |
| 8,415,897 B2 | 4/2013 | Choong et al. |
| 8,422,401 B1 | 4/2013 | Choong et al. |
| 8,445,826 B2 | 5/2013 | Verfuerth |
| 8,450,670 B2 | 5/2013 | Verfuerth et al. |
| 8,466,626 B2 | 6/2013 | Null et al. |
| 8,476,565 B2 | 7/2013 | Verfuerth |
| 8,531,134 B2 | 9/2013 | Chemel et al. |
| 8,536,802 B2 | 9/2013 | Chemel et al. |
| 8,543,249 B2 | 9/2013 | Chemel et al. |
| 8,552,664 B2 | 10/2013 | Chemel et al. |
| 8,586,902 B2 | 11/2013 | Verfuerth |
| 8,593,135 B2 | 11/2013 | Chemel et al. |
| 8,604,701 B2 | 12/2013 | Verfuerth et al. |
| 8,610,376 B2 | 12/2013 | Chemel et al. |
| 8,610,377 B2 | 12/2013 | Chemel et al. |
| 8,729,833 B2 | 5/2014 | Chemel et al. |
| 8,754,589 B2 | 6/2014 | Chemel et al. |
| 8,755,039 B2 | 6/2014 | Ramer et al. |
| 8,805,550 B2 | 8/2014 | Chemel et al. |
| 8,823,277 B2 | 9/2014 | Chemel et al. |
| 8,841,859 B2 | 9/2014 | Chemel et al. |
| 8,866,408 B2 | 10/2014 | Chemel et al. |
| 8,954,170 B2 | 2/2015 | Chemel et al. |
| 9,014,829 B2 | 4/2015 | Chemel et al. |
| 9,072,133 B2 | 6/2015 | Chemel et al. |
| 9,125,254 B2 | 9/2015 | Chemel et al. |
| 9,241,392 B2 | 1/2016 | Chemel et al. |
| 2001/0028227 A1 | 10/2001 | Lys et al. |
| 2001/0055965 A1 | 12/2001 | Delp et al. |
| 2002/0032535 A1 | 3/2002 | Alexander et al. |
| 2002/0036430 A1 | 3/2002 | Welches et al. |
| 2002/0038157 A1 | 3/2002 | Dowling et al. |
| 2002/0047628 A1 | 4/2002 | Morgan et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0133270 A1 | 9/2002 | Hung et al. |
| 2002/0134849 A1 | 9/2002 | Disser |
| 2002/0145394 A1 | 10/2002 | Morgan et al. |
| 2002/0152045 A1 | 10/2002 | Dowling et al. |
| 2002/0153851 A1 | 10/2002 | Morgan et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0175642 A1 | 11/2002 | von Kannewurff et al. |
| 2003/0011538 A1 | 1/2003 | Lys et al. |
| 2003/0057886 A1 | 3/2003 | Lys et al. |
| 2003/0057887 A1 | 3/2003 | Dowling et al. |
| 2003/0057888 A1 | 3/2003 | Archenhold et al. |
| 2003/0057890 A1 | 3/2003 | Lys et al. |
| 2003/0063462 A1 | 4/2003 | Shimizu et al. |
| 2003/0076056 A1 | 4/2003 | Schuurmans |
| 2003/0076281 A1 | 4/2003 | Morgan et al. |
| 2003/0097309 A1 | 5/2003 | Gibler et al. |
| 2003/0100837 A1 | 5/2003 | Lys et al. |
| 2003/0100998 A2 | 5/2003 | Brunner et al. |
| 2003/0102675 A1 | 6/2003 | Noethlichs |
| 2003/0123705 A1 | 7/2003 | Stam et al. |
| 2003/0123706 A1 | 7/2003 | Stam et al. |
| 2003/0133292 A1 | 7/2003 | Mueller et al. |
| 2003/0137258 A1 | 7/2003 | Piepgras et al. |
| 2003/0206411 A9 | 11/2003 | Dowling et al. |
| 2003/0214259 A9 | 11/2003 | Dowling et al. |
| 2003/0216971 A1 | 11/2003 | Sick et al. |
| 2003/0222587 A1 | 12/2003 | Dowling et al. |
| 2003/0222603 A1 | 12/2003 | Mogilner et al. |
| 2004/0002792 A1 | 1/2004 | Hoffknecht |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1* | 6/2004 | Spero .......................... 362/276 |
| 2004/0111638 A1 | 6/2004 | Yadav et al. |
| 2004/0113044 A1 | 6/2004 | Ishiguchi |
| 2004/0113568 A1 | 6/2004 | Dowling et al. |
| 2004/0119415 A1 | 6/2004 | Lansing et al. |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0240890 A1 | 12/2004 | Lys et al. |
| 2004/0252501 A1 | 12/2004 | Moriyama et al. |
| 2004/0257007 A1 | 12/2004 | Lys et al. |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0099796 A1 | 5/2005 | Magee |
| 2005/0099824 A1 | 5/2005 | Dowling et al. |
| 2005/0116667 A1 | 6/2005 | Mueller et al. |
| 2005/0125083 A1 | 6/2005 | Kiko |
| 2005/0128751 A1 | 6/2005 | Roberge et al. |
| 2005/0151489 A1 | 7/2005 | Lys et al. |
| 2005/0162101 A1 | 7/2005 | Leong et al. |
| 2005/0174473 A1 | 8/2005 | Morgan et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0258765 A1* | 11/2005 | Rodriguez et al. ............. 315/86 |
| 2005/0275626 A1 | 12/2005 | Mueller et al. |
| 2005/0276053 A1 | 12/2005 | Nortrup et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0022214 A1 | 2/2006 | Morgan et al. |
| 2006/0038511 A1 | 2/2006 | Tagawa |
| 2006/0050509 A9 | 3/2006 | Dowling et al. |
| 2006/0076908 A1 | 4/2006 | Morgan et al. |
| 2006/0087843 A1 | 4/2006 | Setomoto et al. |
| 2006/0098077 A1 | 5/2006 | Dowling |
| 2006/0104058 A1 | 5/2006 | Chemel et al. |
| 2006/0106762 A1 | 5/2006 | Caracas et al. |
| 2006/0108935 A1 | 5/2006 | Stevn |
| 2006/0109649 A1 | 5/2006 | Ducharme et al. |
| 2006/0125426 A1 | 6/2006 | Veskovic et al. |
| 2006/0132061 A1 | 6/2006 | McCormick et al. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0160199 A1 | 7/2006 | DiCosimo et al. |
| 2006/0170376 A1 | 8/2006 | Piepgras et al. |
| 2006/0181878 A1 | 8/2006 | Burkholder |
| 2006/0198128 A1 | 9/2006 | Piepgras et al. |
| 2006/0208667 A1 | 9/2006 | Lys et al. |
| 2006/0221606 A1 | 10/2006 | Dowling |
| 2006/0245174 A1 | 11/2006 | Ashdown et al. |
| 2006/0262516 A9 | 11/2006 | Dowling et al. |
| 2006/0262521 A1 | 11/2006 | Piepgras et al. |

(56) References Cited

U.S. PATENT DOCUMENTS

| | | |
|---|---|---|
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0276938 A1 | 12/2006 | Miller |
| 2006/0285325 A1 | 12/2006 | Ducharme et al. |
| 2007/0021946 A1 | 1/2007 | Williams et al. |
| 2007/0030716 A1* | 2/2007 | Manolescu ............ 363/84 |
| 2007/0032990 A1 | 2/2007 | Williams et al. |
| 2007/0040513 A1 | 2/2007 | Cleland et al. |
| 2007/0045407 A1 | 3/2007 | Paul |
| 2007/0047227 A1 | 3/2007 | Ducharme |
| 2007/0064425 A1 | 3/2007 | Frecska et al. |
| 2007/0086754 A1 | 4/2007 | Lys et al. |
| 2007/0086912 A1 | 4/2007 | Dowling et al. |
| 2007/0115658 A1 | 5/2007 | Mueller et al. |
| 2007/0115665 A1 | 5/2007 | Mueller et al. |
| 2007/0143046 A1 | 6/2007 | Budike, Jr. |
| 2007/0145915 A1 | 6/2007 | Roberge et al. |
| 2007/0152797 A1 | 7/2007 | Chemel et al. |
| 2007/0153514 A1 | 7/2007 | Dowling et al. |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0206375 A1 | 9/2007 | Piepgras et al. |
| 2007/0211463 A1 | 9/2007 | Chevalier et al. |
| 2007/0217196 A1 | 9/2007 | Shaner |
| 2007/0228999 A1 | 10/2007 | Kit |
| 2007/0229250 A1 | 10/2007 | Recker et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0267978 A1 | 11/2007 | Shteynberg et al. |
| 2007/0273307 A1 | 11/2007 | Westrick et al. |
| 2007/0291483 A1 | 12/2007 | Lys |
| 2008/0007943 A1 | 1/2008 | Verfuerth et al. |
| 2008/0007944 A1 | 1/2008 | Verfuerth et al. |
| 2008/0012502 A1 | 1/2008 | Lys |
| 2008/0012506 A1 | 1/2008 | Mueller et al. |
| 2008/0030149 A1 | 2/2008 | Callahan |
| 2008/0074059 A1 | 3/2008 | Ahmed |
| 2008/0079568 A1 | 4/2008 | Primous et al. |
| 2008/0089060 A1 | 4/2008 | Kondo et al. |
| 2008/0140231 A1 | 6/2008 | Blackwell et al. |
| 2008/0158878 A1 | 7/2008 | Van Laanen et al. |
| 2008/0164826 A1 | 7/2008 | Lys |
| 2008/0164827 A1 | 7/2008 | Lys |
| 2008/0164854 A1 | 7/2008 | Lys |
| 2008/0170371 A1 | 7/2008 | Lai |
| 2008/0180015 A1 | 7/2008 | Wu et al. |
| 2008/0183081 A1 | 7/2008 | Lys et al. |
| 2008/0183307 A1 | 7/2008 | Clayton et al. |
| 2008/0183316 A1 | 7/2008 | Clayton |
| 2008/0195561 A1 | 8/2008 | Herzig |
| 2008/0204268 A1 | 8/2008 | Dowling et al. |
| 2008/0208651 A1 | 8/2008 | Johnston et al. |
| 2008/0215391 A1 | 9/2008 | Dowling et al. |
| 2008/0246415 A1 | 10/2008 | Chitta et al. |
| 2008/0265799 A1 | 10/2008 | Sibert |
| 2008/0272934 A1 | 11/2008 | Wang et al. |
| 2008/0275802 A1 | 11/2008 | Verfuerth et al. |
| 2008/0278941 A1 | 11/2008 | Logan et al. |
| 2008/0310850 A1 | 12/2008 | Pederson et al. |
| 2009/0000217 A1 | 1/2009 | Verfuerth et al. |
| 2009/0009989 A1 | 1/2009 | Verfuerth et al. |
| 2009/0014625 A1 | 1/2009 | Bartol et al. |
| 2009/0018673 A1 | 1/2009 | Dushane et al. |
| 2009/0021955 A1 | 1/2009 | Kuang et al. |
| 2009/0027932 A1 | 1/2009 | Haines et al. |
| 2009/0034263 A1 | 2/2009 | Stenback et al. |
| 2009/0050908 A1 | 2/2009 | Yuan et al. |
| 2009/0051506 A1 | 2/2009 | Hicksted et al. |
| 2009/0059603 A1 | 3/2009 | Recker et al. |
| 2009/0059915 A1 | 3/2009 | Baker |
| 2009/0066266 A1 | 3/2009 | Jungwirth et al. |
| 2009/0076790 A1 | 3/2009 | Fein et al. |
| 2009/0085494 A1 | 4/2009 | Summerland |
| 2009/0085500 A1 | 4/2009 | Zampini et al. |
| 2009/0122571 A1 | 5/2009 | Simmons et al. |
| 2009/0147507 A1 | 6/2009 | Verfuerth et al. |
| 2009/0160364 A1 | 6/2009 | Ackermann et al. |
| 2009/0189535 A1 | 7/2009 | Verfuerth et al. |
| 2009/0193217 A1 | 7/2009 | Korecki et al. |
| 2009/0243517 A1 | 10/2009 | Verfuerth et al. |
| 2009/0248217 A1 | 10/2009 | Verfuerth et al. |
| 2009/0267540 A1 | 10/2009 | Chemel et al. |
| 2009/0278472 A1 | 11/2009 | Mills et al. |
| 2009/0278479 A1 | 11/2009 | Platner et al. |
| 2009/0284184 A1 | 11/2009 | Valois et al. |
| 2009/0299527 A1 | 12/2009 | Huizenga et al. |
| 2009/0299811 A1 | 12/2009 | Verfuerth et al. |
| 2009/0303722 A1 | 12/2009 | Verfuerth et al. |
| 2009/0315485 A1 | 12/2009 | Verfuerth et al. |
| 2009/0323347 A1 | 12/2009 | Zhang et al. |
| 2010/0026479 A1 | 2/2010 | Tran |
| 2010/0034386 A1 | 2/2010 | Choong et al. |
| 2010/0052574 A1 | 3/2010 | Blakeley |
| 2010/0061088 A1 | 3/2010 | Bartol et al. |
| 2010/0109536 A1 | 5/2010 | Jung et al. |
| 2010/0127634 A1 | 5/2010 | Dowling et al. |
| 2010/0134051 A1 | 6/2010 | Huizenga et al. |
| 2010/0135186 A1 | 6/2010 | Choong et al. |
| 2010/0141153 A1* | 6/2010 | Recker ............... H05B 33/0803 315/149 |
| 2010/0148689 A1 | 6/2010 | Morgan et al. |
| 2010/0169249 A1 | 7/2010 | Jhala et al. |
| 2010/0171145 A1 | 7/2010 | Morgan et al. |
| 2010/0171442 A1* | 7/2010 | Draper et al. ................. 315/297 |
| 2010/0185339 A1 | 7/2010 | Huizenga et al. |
| 2010/0201267 A1 | 8/2010 | Bourquin et al. |
| 2010/0204841 A1 | 8/2010 | Chemel et al. |
| 2010/0207534 A1 | 8/2010 | Dowling et al. |
| 2010/0211443 A1 | 8/2010 | Carrel et al. |
| 2010/0246168 A1 | 9/2010 | Verfuerth et al. |
| 2010/0246172 A1 | 9/2010 | Liu |
| 2010/0253499 A1 | 10/2010 | Haab et al. |
| 2010/0259931 A1 | 10/2010 | Chemel et al. |
| 2010/0262313 A1 | 10/2010 | Chambers et al. |
| 2010/0264834 A1 | 10/2010 | Gaines et al. |
| 2010/0264846 A1 | 10/2010 | Chemel et al. |
| 2010/0270933 A1 | 10/2010 | Chemel et al. |
| 2010/0283605 A1 | 11/2010 | Nevins |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0307075 A1 | 12/2010 | Zampini et al. |
| 2010/0308736 A1 | 12/2010 | Hung et al. |
| 2010/0327766 A1* | 12/2010 | Recker ..................... H02J 9/02 315/291 |
| 2011/0001436 A1 | 1/2011 | Chemel et al. |
| 2011/0001438 A1 | 1/2011 | Chemel et al. |
| 2011/0033632 A1 | 2/2011 | Vance et al. |
| 2011/0035404 A1 | 2/2011 | Morgan et al. |
| 2011/0038148 A1 | 2/2011 | Pyle |
| 2011/0043124 A1 | 2/2011 | Johnston et al. |
| 2011/0057581 A1 | 3/2011 | Ashar et al. |
| 2011/0060701 A1 | 3/2011 | Verfuerth et al. |
| 2011/0068702 A1 | 3/2011 | Van De Ven et al. |
| 2011/0084608 A1 | 4/2011 | Lin et al. |
| 2011/0090684 A1 | 4/2011 | Logan et al. |
| 2011/0102052 A1 | 5/2011 | Billingsley et al. |
| 2011/0118890 A1 | 5/2011 | Parsons |

(56) References Cited

U.S. PATENT DOCUMENTS

| | | |
|---|---|---|
| 2011/0133655 A1* | 6/2011 | Recker ............... H02J 9/02 315/159 |
| 2011/0140611 A1 | 6/2011 | Elek et al. |
| 2011/0140612 A1 | 6/2011 | Mohan et al. |
| 2011/0146669 A1 | 6/2011 | Bartol et al. |
| 2011/0172844 A1 | 7/2011 | Choong et al. |
| 2011/0198977 A1 | 8/2011 | VanderSluis |
| 2011/0204820 A1 | 8/2011 | Tikkanen et al. |
| 2011/0216538 A1 | 9/2011 | Logan et al. |
| 2011/0235317 A1 | 9/2011 | Verfuerth et al. |
| 2011/0248171 A1* | 10/2011 | Rueger et al. ............... 250/340 |
| 2011/0254466 A1 | 10/2011 | Jackson et al. |
| 2011/0279063 A1 | 11/2011 | Wang et al. |
| 2011/0279248 A1 | 11/2011 | Ogawa |
| 2012/0007511 A1 | 1/2012 | Choong et al. |
| 2012/0032599 A1 | 2/2012 | Mohan et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0044670 A1 | 2/2012 | Piepgras et al. |
| 2012/0058663 A1 | 3/2012 | Oster |
| 2012/0062125 A1 | 3/2012 | Mohan et al. |
| 2012/0080944 A1* | 4/2012 | Recker ............... H02J 9/02 307/25 |
| 2012/0081906 A1 | 4/2012 | Verfuerth et al. |
| 2012/0098439 A1* | 4/2012 | Recker ............... H05B 33/0815 315/152 |
| 2012/0112654 A1 | 5/2012 | Choong et al. |
| 2012/0112667 A1 | 5/2012 | Mohan et al. |
| 2012/0130544 A1 | 5/2012 | Mohan et al. |
| 2012/0143357 A1 | 6/2012 | Chemel et al. |
| 2012/0167957 A1 | 7/2012 | Verfuerth et al. |
| 2012/0182729 A1 | 7/2012 | Verfuerth et al. |
| 2012/0203601 A1 | 8/2012 | Verfuerth et al. |
| 2012/0209755 A1 | 8/2012 | Verfuerth et al. |
| 2012/0229049 A1 | 9/2012 | Mohan et al. |
| 2012/0233045 A1 | 9/2012 | Verfuerth et al. |
| 2012/0235579 A1 | 9/2012 | Chemel et al. |
| 2012/0274222 A1 | 11/2012 | Verfuerth et al. |
| 2012/0286673 A1 | 11/2012 | Holland et al. |
| 2012/0299485 A1 | 11/2012 | Mohan et al. |
| 2012/0326608 A1 | 12/2012 | Mohan et al. |
| 2013/0006437 A1 | 1/2013 | Verfuerth et al. |
| 2013/0020949 A1 | 1/2013 | Mohan et al. |
| 2013/0033183 A1 | 2/2013 | Verfuerth et al. |
| 2013/0063042 A1 | 3/2013 | Bora et al. |
| 2013/0069542 A1 | 3/2013 | Curasi et al. |
| 2013/0069543 A1 | 3/2013 | Mohan et al. |
| 2013/0088168 A1 | 4/2013 | Mohan et al. |
| 2013/0094230 A1 | 4/2013 | Verfuerth et al. |
| 2013/0131882 A1 | 5/2013 | Verfuerth et al. |
| 2013/0141904 A1 | 6/2013 | Verfuerth et al. |
| 2013/0169185 A1 | 7/2013 | Dai et al. |
| 2013/0176401 A1* | 7/2013 | Monari ............... H04N 5/2252 348/47 |
| 2013/0193857 A1 | 8/2013 | Tlachac et al. |
| 2013/0229795 A1 | 9/2013 | Wang et al. |
| 2013/0257292 A1 | 10/2013 | Verfuerth et al. |
| 2013/0293117 A1 | 11/2013 | Verfuerth |
| 2013/0293877 A1 | 11/2013 | Ramer et al. |
| 2013/0308325 A1 | 11/2013 | Verfuerth et al. |
| 2014/0028199 A1 | 1/2014 | Chemel et al. |
| 2014/0117852 A1 | 5/2014 | Zhai et al. |
| 2014/0252961 A1 | 9/2014 | Ramer et al. |
| 2014/0285090 A1 | 9/2014 | Chemel et al. |
| 2014/0285095 A1 | 9/2014 | Chemel et al. |
| 2014/0292208 A1* | 10/2014 | Chemel et al. ............... 315/154 |
| 2014/0293605 A1 | 10/2014 | Chemel et al. |
| 2014/0333222 A1 | 11/2014 | Chemel et al. |
| 2014/0375206 A1 | 12/2014 | Holland et al. |
| 2015/0008827 A1 | 1/2015 | Carrigan et al. |
| 2015/0008828 A1 | 1/2015 | Carrigan et al. |
| 2015/0061511 A1 | 3/2015 | Chemel et al. |
| 2015/0184842 A1 | 7/2015 | Chemel et al. |
| 2016/0050725 A1 | 2/2016 | Johnston et al. |

FOREIGN PATENT DOCUMENTS

| | | |
|---|---|---|
| JP | 2006-106762 | 4/2006 |
| JP | 2007-045407 A | 2/2007 |
| WO | WO 96/20369 | 7/1996 |
| WO | WO 2007/003038 A1 | 1/2007 |
| WO | WO 2007/116332 A2 | 10/2007 |
| WO | WO 2009/003279 | 1/2009 |

OTHER PUBLICATIONS

Progress Report: Reducing Barriers to Use of High Efficiency Lighting Systems; Oct. 2001, (http://www.lrc.rpi.edu/researchAreas/reducingBarriers/pdf/year1FinalReport.pdf), 108 pages.

ZigBee Alliance "Wireless Sensors and Control Networks: Enabling New Opportunities with ZigBee", Bob Heile, Chairman, ZigBee Alliance, Dec. 2006 Powerpoint Presentation, 53 pages.

ZigBee Specification Document 053474r17, Notice of Use and Disclosure; Jan. 17, 2008 11:09 A.M., Sponsored by: ZibEe Alliance; Copyright © 2007 ZigBee Standards Organizat. All rights reserved, 602 pages.

Vainio, A.-M. et al., Learning and adaptive fuzzy control system for smart home, Mar. 2008, http://www.springerlink.com/content/ll72k3200el4qx81/fulltext.pdf, 10 pages.

ZigBee Alliance Document No. 08006r03, Jun. 2008, ZigBee-200y Layer Pics and Stack Profile, Copyright © 1996-2008 by the ZigBee Alliance. 2400 Camino Ramon, Suite 375, San Ramon, CA 94583, USA; http://www.zigbee.org, 119 pages.

International Search Report in International Application No. PCT/US2009/040514 mailed Jun. 26, 2009, 4 pages.

Written Opinion in International Application No. PCT/US2009/040514, dated Jun. 26, 2009, 3 pages.

International Preliminary Report on Patentability of PCT/US2009/040514, dated Oct. 19, 2010, 4 pages.

Albeo Technologies, C Series, http://www.albeotech.com/?site_id=1500&item_id=161711, retrieved May 18, 2011, 2 pages.

Albeo Technologies, C3 Series, http://www.albeotech.com/?site_id=1500&item_id=173338, retrieved May 18, 2011, 2 pages.

Albeo Technologies, S Series, http://www.albeotech.com/?site_id=1500&item_id=161722, retrieved May 18, 2011, 2 pages.

Albeo Technologies, Surface Mounts, http://www.albeotech.com/?site_id=1500&item_id=161724, retrieved May 18, 2011, 2 pages.

Beta LED, 227 Series LED Canopy, http://www.betaled.com/us-en/TechnicalLibrary/TechnicalDocuments/227-series-canopy.aspx, retrieved May 18, 2011, 2 pages.

Beta LED, 227 Series LED Soffit, http://www.betaled.com/us-en/TechnicalLibrary/TechnicalDocuments/227-series-soffit.aspx, retrieved May 18, 2011, 2 pages.

Beta LED, 304 Series LED Interior, http://www.betaled.com/us-en/TechnicalLibrary/TechnicalDocuments/304-series-canopy.aspx, retrieved May 18, 2011, 2 pages.

Beta LED, 304 Series LED Parking Structure, http://www.betaled.com/us-en/TechnicalLibrary/TechnicalDocuments/304-series-parking.aspx, retrieved May 18, 2011, 2 pages.

Beta LED, 304 Series LED Soffit, http://www.betaled.com/us-en/TechnicalLibrary/TechnicalDocuments/304-series-soffit.aspx, retrieved May 18, 2011, 2 pages.

Beta LED, The Edge Canopy, http://www.betaled.com/us-en/TechnicalLibrary/TechnicalDocuments/TheEdgeCanopy.aspx, retrieved May 18, 2011, 2 pages.

Beta LED, The Edge LED Parking Structure, http://www.betaled.com/us-en/TechnicalLibrary/TechnicalDocuments/TheEdgeParking.aspx, retrieved May 18, 2011, 2 pages.

Color Kinetics, eW Cove EC Powercore line, http://www.colorkinetics.com/support/datasheets/eW_Cove_EC_Powercore_2700K_12in_SpecSheet.pdf, retrieved May 18, 2011, 2 pages.

(56) References Cited

OTHER PUBLICATIONS

Color Kinetics, eW Cove MX Powercore line, http://www.colorkinetics.com/support/datasheets/eW_Cove_MX_Powercore_2700K_Wide_Beam_Angle_SpecSheet.pdf, retrieved May 18, 2011, 2 pages.
Color Kinetics, eW Cove QLX Powercore line, http://www.colorkinetics.com/support/datasheets/eW_Cove_QLX_Powercore_6in_110degreex110degree.pdf, retrieved May 18, 2011, 2 pages.
Color Kinetics, eW Fuse Powercore line, http://www.colorkinetics.com/support/datasheets/eW_Fuse_Powercore_2700K_10degree_x_60degree.pdf, retrieved May 18, 2011, 2 pages.
Color Kinetics, eW Graze Powercore line, http://www.colorkinetics.com/support/datasheets/eW_Graze_Powercore_SpecSheet_2700K_10x60.pdf, retrieved May 18, 2011, 2 pages.
Office Action in U.S. Appl. No. 12/423,543, dated Jun. 27, 2011, 14 pages.
Notice of Allowance in U.S. Appl. No. 12/823,195, mailed Oct. 27, 2011, 7 pages.
Office Action in U.S. Appl. No. 12/817,425, mailed Nov. 3, 2011, 14 pages.
Notice of Allowance in U.S. Appl. No. 12/823,195, mailed Dec. 12, 2011, 8 pages.
Office Action in U.S. Appl. No. 12/822,421, mailed Jan. 19, 2012, 20 pages.
International Search Report and Written Opinion in International Application No. PCT/US2011/059334, mailed Feb. 2, 2012, 11 pages.
Notice of Allowance in U.S. Appl. No. 12/423,543, mailed Feb. 8, 2012, 12 pages.
Office Action in U.S. Appl. No. 12/830,868, mailed Mar. 5, 2012, 5 pages.
Office Action in U.S. Appl. No. 12/822,577, mailed Apr. 2, 2012, 25 pages.
Office Action in U.S. Appl. No. 12/831,476, mailed Apr. 11, 2012, 7 pages.
Notice of Allowance in U.S. Appl. No. 12/423,543, mailed Apr. 11, 2012, 8 pages.
Office Action in U.S. Appl. No. 12/817,425, mailed Apr. 30, 2012, 18 pages.
Office Action in U.S. Appl. No. 12/828,495, mailed May 17, 2012, 6 pages.
Notice of Allowance in U.S. Appl. No. 12/423,543, mailed Jun. 21, 2012, 4 pages.
Office Action in U.S. Appl. No. 12/824,797, mailed Jun. 29, 2012, 5 pages.
Office Action in U.S. Appl. No. 12/828,340, mailed Jul. 2, 2012, 4 pages.
Office Action in U.S. Appl. No. 12/827,397, mailed Jul. 11, 2012, 6 pages.
International Search Report and Written Report in International Application No. PCT/US12/29834, mailed Jul. 12, 2012, 10 pages.
Office Action in U.S. Appl. No. 12/830,868, mailed Aug. 13, 2012, 26 pages.
Office Action in U.S. Appl. No. 12/833,332, mailed Aug. 20, 2012, 5 pages.
Extended European Report and Opinion for European Appln No. EP 09732558.3, dated Aug. 23, 2012, 8 pages.
Office Action in U.S. Appl. No. 12/822,421, mailed Sep. 12, 2012, 16 pages.
Office Action in U.S. Appl. No. 12/828,385, mailed Sep. 12, 2012, 5 pages.
Office Action in U.S. Appl. No. 12/832,179, mailed Sep. 12, 2012, 5 pages.
Office Action in U.S. Appl. No. 12/832,211, mailed Sep. 12, 2012, 4 pages.
Office Action in U.S. Appl. No. 12/833,181, mailed Sep. 12, 2012, 5 pages.
Office Action in U.S. Appl. No. 12/827,336, mailed Oct. 4, 2012, 26 pages.
Office Action in U.S. Appl. No. 12/822,577, mailed Oct. 11, 2012, 21 pages.
Office Action in U.S. Appl. No. 12/831,476, mailed Oct. 17, 2012, 36 pages.
Notice of Allowance in U.S. Appl. No. 12/827,397, mailed Oct. 29, 2012, 5 pages.
Notice of Allowance in U.S. Appl. No. 12/824,797 mailed Nov. 9, 2012, 8 pages.
Notice of Allowance in U.S. Appl. No. 12/828,340, mailed Nov. 21, 2012, 5 pages.
Office Action in U.S. Appl. No. 12/833,332 mailed Nov. 23, 2012, 5 pages.
Office Action in U.S. Appl. No. 12/828,495, mailed Dec. 12, 2012, 21 pages.
International Preliminary Report on Patentability of PCT/US2011/059334, dated May 7, 2013, 8 pages.
Office Action in U.S. Appl. No. 12/831,476, mailed Feb. 13, 2013, 42 pages.
Notice of Allowance in U.S. Appl. No. 12/822,421, mailed Mar. 1, 2013, 9 pages.
Office Action in U.S. Appl. No. 12/832,179, mailed Mar. 13, 2013, 13 pages.
Notice of Allowance in U.S. Appl. No. 12/822,577, mailed Mar. 15, 2013, 10 pages.
International Search Report and Written Opinion in International Application No. PCT/US2012/063372, mailed Mar. 19, 2013, 18 pages.
Office Action in U.S. Appl. No. 12/828,385, mailed Mar. 19, 2013, 12 pages.
Notice of Allowance in U.S. Appl. No. 12/833,332, mailed Mar. 21, 2013, 8 pages.
Notice of Allowance in U.S. Appl. No. 12/830,868, mailed Mar. 25, 2013, 9 pages.
Office Action in U.S. Appl. No. 12/828,495, mailed Mar. 28, 2013, 22 pages.
Examination Report in Australian Patent Application No. 2009236311, dated May 10, 2013, 3 pages.
Notice of Allowance in U.S. Appl. No. 12/833,181, mailed May 23, 2013, 18 pages.
International Search Report and Written Opinion in International Application No. PCT/US2013/031790, mailed Jun. 3, 2013, 13 pages.
Office Action in U.S. Appl. No. 12/827,336, mailed Jun. 13, 2013, 6 pages.
Office Action in U.S. Appl. No. 12/831,358, mailed Jun. 13, 2013, 7 pages.
Office Action in U.S. Appl. No. 12/832,211, mailed Jun. 20, 2013, 12 pages.
Notice of Allowance in U.S. Appl. No. 12/830,868, mailed Jun. 24, 2013, 6 pages.
Office Action in U.S. Appl. No. 12/832,179, mailed Jul. 17, 2013, 15 pages.
Office Action in U.S. Appl. No. 12/831,476, mailed Jul. 23, 2013, 42 pages.
Office Action in U.S. Appl. No. 12/817,425, mailed Sep. 10, 2013, 15 pages.
International Preliminary Report on Patentability in International Application No. PCT/US2012/29834, mailed dated Sep. 24, 2013, 7 pages.
Office Action in U.S. Appl. No. 12/832,211, mailed Oct. 2, 2013, 13 pages.
Notice of Allowance in U.S. Appl. No. 12/827,336, mailed Oct. 2, 2013, 12 pages.
Office Action in U.S. Appl. No. 12/828,495, mailed Oct. 10, 2013, 25 pages.
Office Action in U.S. Appl. No. 12/831,358, mailed Nov. 19, 2013, 16 pages.
Office Action in U.S. Appl. No. 12/831,476, mailed Nov. 21, 2013, 52 pages.
Office Action in U.S. Appl. No. 12/827,209, mailed Jan. 10, 2014, 20 pages.
Notice of Allowance in U.S. Appl. No. 12/828,495, mailed Feb. 19, 2014, 8 pages.

(56) References Cited

OTHER PUBLICATIONS

Notice of Allowance in U.S. Appl. No. 14/045,679, mailed Feb. 20, 2014, 8 pages.
Office Action in U.S. Appl. No. 12/832,179, mailed Feb. 21, 2014, 16 pages.
Office Action in U.S. Appl. No. 13/289,492, mailed Feb. 27, 2014, 28 pages.
Advisory Action in U.S. Appl. No. 12/831,358, mailed Feb. 27, 2014, 2 pages.
Office Action in U.S. Appl. No. 12/817,425, mailed Mar. 27, 2014, 16 pages.
Notice of Allowance in U.S. Appl. No. 12/832,211, mailed Apr. 23, 2014, 10 pages.
International Preliminary Report on Patentability in International Application No. PCT/US2012/063372, dated May 6, 2014, 14 pages.
Office Action in U.S. Appl. No. 13/425,295, mailed Jun. 10, 2014, 12 pages.
Notice of Allowance in U.S. Appl. No. 12/831,476, mailed Jun. 11, 2014, 5 pages.
Notice of Acceptance in Australian Application No. 2009236311, dated Jun. 12, 2014, 2 pages.
Notice of Allowance in U.S. Appl. No. 12/832,179, mailed Aug. 1, 2014, 9 pages.
Office Action in U.S. Appl. No. 13/289,492, mailed Aug. 5, 2014, 29 pages.
Final Office Action in U.S. Appl. No. 13/289,492, dated Aug. 5, 2014, 28 pages.
Examination Report in Australian Patent Application No. 2011323165, dated Aug. 22, 2014, 3 pages.
Notice of Allowance in U.S. Appl. No. 12/831,358, mailed Aug. 29, 2014, 9 pages.
Final Office Action in U.S. Appl. No. 12/817,425, mailed Sep. 15, 2014, 17 pages.
International Search Report and Written Opinion in International Application No. PCT/US2014/35990, mailed Sep. 18, 2014, 11 pages.
International Preliminary Report on Patentability in International Application No. PCT/US2013/031790, mailed Sep. 23, 2014, 10 pages.
Restriction Requirement in U.S. Appl. No. 14/294,081, mailed Oct. 9, 2014, 6 pages.
Examination Report in Australian Patent Application No. 2012230991, dated Nov. 18, 2014, 3 pages.
Notice of Allowance in U.S. Appl. No. 13/289,492, mailed Nov. 19, 2014, 9 pages.
Restriction Requirement in U.S. Appl. No. 12/817,425, mailed Dec. 10, 2014, 6 pages.
Office Action in U.S. Appl. No. 13/425,295 mailed Jun. 29, 2015, 17 pages.
Office Action in Canadian Application No. 2,721,486 dated Jul. 14, 2015, 4 pages.
Office Action in U.S. Appl. No. 14/267,386 mailed Aug. 10, 2015, 27 pages.
Notice of Allowance in U.S. Appl. No. 14/245,196, mailed Sep. 9, 2015, 8 pages.
Final Office Action in U.S. Appl. No. 12/817,425, mailed Sep. 17, 2015, 9 pages.
Notice of Allowance in U.S. Appl. No. 14/245,196, mailed Sep. 23, 2015, 2 pages.
Extended European Report and Opinion for European Appln No. EP 12844864.4, dated Nov. 3, 2015, 8 pages.
Extended European Report and Opinion for European Patent Application No. EP 13763788.0, dated Dec. 17, 2015, 7 pages.
Notice of Acceptance for Australian Patent Application No. 2012332206, dated Jan. 21, 2016, 2 pages.
Office Action in U.S. Appl. No. 13/425,295, mailed Mar. 7, 2016, 16 pages.
Office Action in U.S. Appl. No. 14/294,081, mailed Mar. 14, 2016, 16 pages.
Patent Examination Report No. 1 for Australian Patent Application No. 2013235436, dated Jan. 18, 2016, 3 pages.
Search Report and Office Action in Chinese Patent Application No. 201380026132.5 dated Sep. 12, 2015, 36 pages (original Chinese and English translation).
"Enlightened Energy Management System," ETCC Open Forum, 13 pp. (Jul. 24, 2012).
Office Action in U.S. Appl. No. 12/817,425, mailed Mar. 23, 2016, 9 pages.
Examination Report in Australian Patent Application No. 2015255250, mailed Jun. 1, 2016, 3 pages.
Examination Report in European Patent Application No. 09732558.3, dated Apr. 19, 2016, 5 pages.
Second Office Action in Chinese Patent Application No. 201380026132.5, issued Apr. 20, 2016, 6 pages (w/English translation).
Notice of Allowance in U.S. Appl. No. 14/289,601, mailed Apr. 1, 2015, 9 pages.
Notice of Acceptance in Australian Patent Application No. 2011323165, dated Apr. 10, 2015, 2 pages.
Notice of Allowance in U.S. Appl. No. 14/294,082, mailed May 19, 2015, 8 pages.
Notice of Allowance in U.S. Appl. No. 14/289,601, mailed Jun. 4, 2015, 2 pages.
Final Office Action in U.S. Appl. No. 14/245,196, mailed May 27, 2015, 6 pages.
Final Office Action in U.S. Appl. No. 14/294,081, mailed Jun. 10, 2015, 13 pages.
Final Office Action in U.S. Appl. No. 13/425,295, mailed Jan. 2, 2015, 17 pages.
Office Action in U.S. Appl. No. 14/294,082, mailed Jan. 2, 2015, 10 pages.
Office Action in U.S. Appl. No. 14/294,081, mailed Jan. 22, 2015, 7 pages.
Notice of Allowance in U.S. Appl. No. 13/289,492, mailed Jan. 23, 2015, 10 pages.
International Search Report and Written Opinion in International Application No. PCT/US2014/060095, mailed Jan. 29, 2015, 16 pages.
Office Action in U.S. Appl. No. 14/289,601, mailed Jan. 30, 2015, 6 pages.
Office Action in U.S. Appl. No. 14/245,196, mailed Feb. 9, 2015, 13 pages.
Examination Report in Australian Patent Application No. 2012332206, dated Feb. 12, 2015, 3 pages.
Office Action in U.S. Appl. No. 12/817,425, mailed Feb. 25, 2015, 6 pages.

\* cited by examiner

METHODS, SYSTEMS, AND APPARATUS FOR INTELLIGENT LIGHTING

CROSS-REFERENCES TO RELATED APPLICATIONS

This application claims priority under 35 U.S.C. §111(a) to International Patent Application PCT/US2012/063372, filed Nov. 2, 2012, which in turns claims the priority benefit of U.S. Provisional Patent Application No. 61/555,075, filed on Nov. 3, 2011, entitled "Methods, Apparatus, and Systems for Intelligent Lighting," and of U.S. Provisional Patent Application No. 61/577,354, filed on Dec. 19, 2011, entitled "Methods, Systems, and Apparatus for Daylight Harvesting," both of which applications are hereby incorporated herein by reference.

BACKGROUND

Intelligent lighting systems combine solid-state light sources, embedded sensors and controls, and low-cost pervasive networking to create an integrated illumination system which is highly responsive to its environment. Benefits of some or all such systems may include, but are not limited to, a much higher quality of light tailored specifically to user needs and significant energy savings, compared to legacy lighting system technologies.

In many environments illuminated by artificial light, significant amounts of ambient daylight may be present at certain times of the day. When sufficient levels of ambient light are present, intelligent lighting systems may reduce the amount of artificial light delivered in order to maintain consistent environmental lighting conditions and to save energy. The process of changing the amount of light emitted by a fixture in response to changes in ambient lighting conditions is known as "daylight harvesting."

Conventional lighting fixtures are typically arranged in groups, each of which is on a single circuit. When a detector (or a person) senses that the ambient light level has risen above a predetermined threshold in a given part of the warehouse, the sensor (or person) triggers a switch that turns off an entire circuit. Similarly, if the ambient light level falls below a predetermined threshold, the circuit may be turned on to provide additional light.

SUMMARY

Embodiments of the present invention include a lighting fixture to illuminate an environment and a corresponding method of illuminating the environment, such as a warehouse, a cold-storage facility, an office space, a retail space, an educational facility, an entertainment venue, a sports venue, a transportation facility, and a correctional facility. An exemplary lighting fixture includes a memory, an ambient light sensor, a processor communicatively coupled to the memory and the ambient light sensor, and a light source, such as a light-emitting diode (LED), communicatively coupled to the processor. The memory stores a first transfer function mapping first ambient light levels at a first position within the environment to corresponding second ambient light levels at a second position within the environment. The ambient light sensor measures an actual ambient light level at the first position within the environment. The processor determines: an expected ambient light level at the second position, based on the actual ambient light level measured at the first position and the first transfer function stored in the memory; and a change in a light output of the lighting fixture to provide a desired ambient light level at the second position, based at least in part on the expected ambient light level at the second position. And the light source generates the change in the light output of the lighting fixture so as to provide the desired ambient light level at the second position.

In certain embodiments, the first position is at the lighting fixture and the second position is at a task height within the environment (e.g., about 1 ft to about 6 ft from the floor of the environment).

The memory may be configured to store a plurality of transfer functions, including the first transfer function, each of which maps ambient light levels at the first position within the environment to corresponding ambient light levels at the second position within the environment. Each of these transfer functions may correspond to a different state of the environment. In such cases, the lighting fixture may also include a communications interface to accept a user input selecting the first transfer function from among the plurality of transfer functions and/or a state parameter sensor to provide a state parameter measurement used by the processor to select the first transfer function from among the plurality of transfer functions. For instance, the lighting fixture may include a real-time clock, communicatively coupled to the processor, that provides a timing signal used by the processor to select the first transfer function from among the plurality of transfer functions.

The processor may also be configured to determine a portion of the actual ambient light level provided by the lighting fixture (artificial light) and/or a portion of the actual ambient light level provided by one or more light sources (daylight) other than the lighting fixture. For example, the ambient light sensor may sense a wavelength of at least one spectral component of the actual ambient light level, and the processor may determining the amount of artificial light and/or daylight in the actual ambient light based on the wavelength sensed by the ambient light sensor.

The processor may control the light source to generate the change in the light output of the lighting fixture so as to provide the desired ambient light level at the second position. For instance, the processor may adjust the intensity, beam pattern, direction, color, and/or a color temperature of the light output.

An exemplary lighting fixture may also include an occupancy sensor, communicatively coupled to the processor, that senses a presence of at least one occupant within the environment and provides an occupancy signal indicative of the at least one occupant. The processor may select the desired ambient light level at the second position within the environment based at least in part on the occupancy signal. In addition, the occupancy sensor may sense a number of occupants within the environment, a location of the at least one occupant within the environment, and/or a motion of the at least one occupant within the environment.

Additional embodiments include a sensing module and corresponding method of calibrating a sensing module. (Such a sensing module may be integrated into or communicatively coupled to a lighting fixture or ballast interface.) An exemplary sensing module includes an ambient light sensor, a memory, and a processor communicatively coupled to the ambient light sensor and to the memory. The ambient light sensor generates an actual output representative of a change in an actual ambient light level of the environment caused by a change in a light output of at least one light source illuminating the environment. The memory stores a transfer function mapping ambient light levels of an environment to corresponding outputs of the ambient light sensor. And the processor determines (1) an expected output of the ambient light sensor based on the transfer function stored in the memory and the change in the ambient light level and (2) a difference between the actual output and the expected output. The processor also updates the transfer function stored in the memory based on the difference between the actual output and the expected output.

An exemplary sensing module may also include a communications interface, communicatively coupled to the processor, to transmit a signal that causes the at least one light source to generate the change in the light output. In addition, the processor may log, in the memory, the output, the expect output, and the change in the light output of the at least one light source illuminating the environment.

Yet another embodiment includes a ballast interface for a light-emitting diode (LED) lighting fixture and a corresponding method of operating a ballast interface. The ballast interface includes a power input, an LED driver circuit, a power meter operatively coupled to the power input, and a power management unit (PMU) communicatively coupled to the power meter. The power input receives alternating current (AC) power. The LED driver circuit transforms the AC power to power suitable for driving at least one LED in the LED lighting fixture. The power meter senses a waveform of the AC power. And the PMU adjusts the LED driver circuit in response to the waveform of the AC power.

In some cases, the power meter measures a phase angle, a power factor, and/or a noise level of the AC power. The PMU may determine a presence of at least one of a brownout and a lightning strike based on the waveform of the AC power. The PMU may a current drawn by the LED driver circuit to power the at least one LED in response to the waveform of the AC power. The PMU and/or the power meter may also store a representation of the waveform of the AC power in a memory.

For purposes of the present disclosure, the term "ambient light" refers to visible radiation (i.e., radiation whose wavelength is between about 450 nm and about 700 nm) that pervades a given environment or space. In other words, ambient light is the soft, indirect light that fills the volume of the environment and is perceptible to a person within the environment.

Similarly, the term "ambient light level" refers to the illuminance, or luminous flux on a surface per unit area. The illuminance is a measure of how much the incident light illuminates the surface, wavelength-weighted by the luminosity function to correlate with human brightness perception. Luminous flux may be measured in lux (lumens per square meter) or foot-candles.

The following U.S. published applications are hereby incorporated herein by reference:

U.S. Pat. No. 8,232,745, filed Apr. 14, 2009, and entitled "MODULAR LIGHTING SYSTEMS";

U.S. Pat. No. 8,138,690, filed Jun. 25, 2010, and entitled "LED-BASED LIGHTING METHODS, APPARATUS, AND SYSTEMS EMPLOYING LED LIGHT BARS, OCCUPANCY SENSING, LOCAL STATE MACHINE, AND METER CIRCUIT";

U.S. Pre-Grant Publication No. 2010-0296285-A1, published Nov. 25, 2010, filed Jun. 17, 2010, and entitled "SENSOR-BASED LIGHTING METHODS, APPARATUS, AND SYSTEMS EMPLOYING ROTATABLE LED LIGHT BARS";

U.S. Pre-Grant Publication No. 2010-0301773-A1, published Dec. 2, 2010, filed Jun. 24, 2010, and entitled "LED-BASED LIGHTING METHODS, APPARATUS, AND SYSTEMS EMPLOYING LED LIGHT BARS OCCUPANCY SENSING, AND LOCAL STATE MACHINE";

U.S. Pre-Grant Publication No. 2010-0302779-A1, published Dec. 2, 2010, filed Jun. 24, 2010, and entitled "LED-BASED LIGHTING METHODS, APPARATUS, AND SYSTEMS EMPLOYING LED LIGHT BARS, OCCUPANCY SENSING, LOCAL STATE MACHINE, AND TIME-BASED TRACKING OF OPERATIONAL MODES";

U.S. Pre-Grant Publication No. 2010-0264846-A1, published Oct. 21, 2010, filed Jun. 28, 2010, and entitled "POWER MANAGEMENT UNIT WITH ADAPTIVE DIMMING";

U.S. Pre-Grant Publication No. 2010-0295473-A1, published Nov. 25, 2010, filed Jun. 30, 2010, and entitled "LED LIGHTING METHODS, APPARATUS, AND SYSTEMS INCLUDING RULES-BASED SENSOR DATA LOGGING";

U.S. Pre-Grant Publication No. 2010-0301768-A1, published Dec. 2, 2010, filed Jun. 30, 2010, and entitled "LED LIGHTING METHODS, APPARATUS, AND SYSTEMS INCLUDING HISTORIC SENSOR DATA LOGGING";

U.S. Pre-Grant Publication No. 2010-0270933-A1, published Oct. 28, 2010, filed Jun. 30, 2010, and entitled "POWER MANAGEMENT UNIT WITH POWER METERING";

U.S. Pre-Grant Publication No. 2012-0235579, published Sep. 20, 2012, filed Mar. 20, 2012, and entitled "METHODS, APPARATUS AND SYSTEMS FOR PROVIDING OCCUPANCY-BASED VARIABLE LIGHTING";

U.S. Pre-Grant Publication No. 2012-0143357, published Jun. 7, 2012, filed Nov. 4, 2011, and entitled "METHOD, APPARATUS, AND SYSTEM FOR OCCUPANCY SENSING";

WO 2012/061709, published May 10, 2012, filed Nov. 4, 2011, and entitled "METHOD, APPARATUS, AND SYSTEM FOR OCCUPANCY SENSING"; and WO 2012/129243, published Sep. 27, 2012, filed Mar. 20, 2012, and entitled "METHODS, APPARATUS AND SYSTEMS FOR PROVIDING OCCUPANCY-BASED VARIABLE LIGHTING."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 2A:
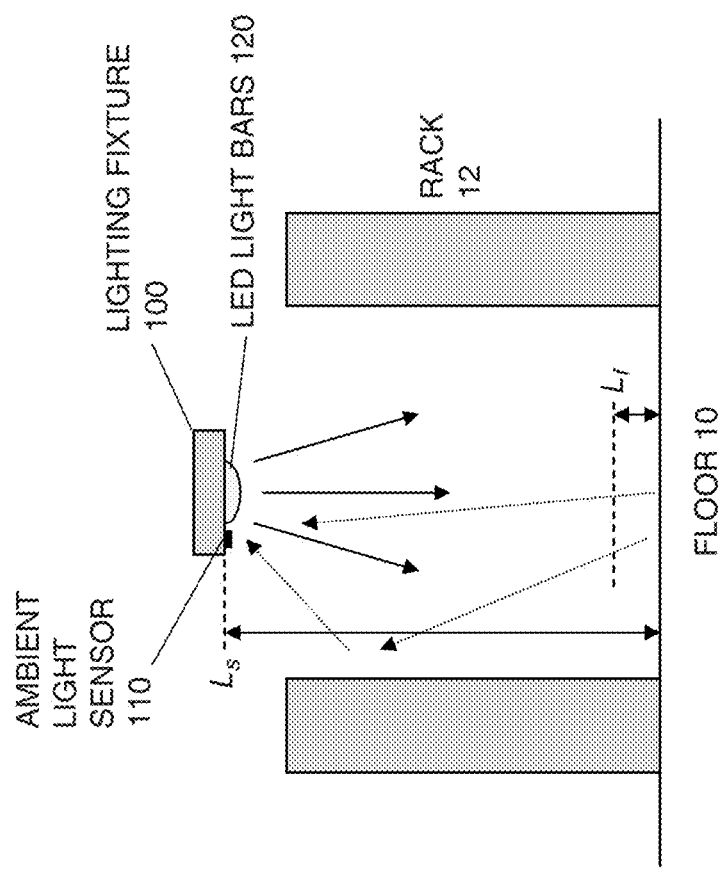
FIG. 2A illustrates a typical warehouse environment illuminated by a lighting fixture, according to one embodiment of the present invention.
Figure 2B:
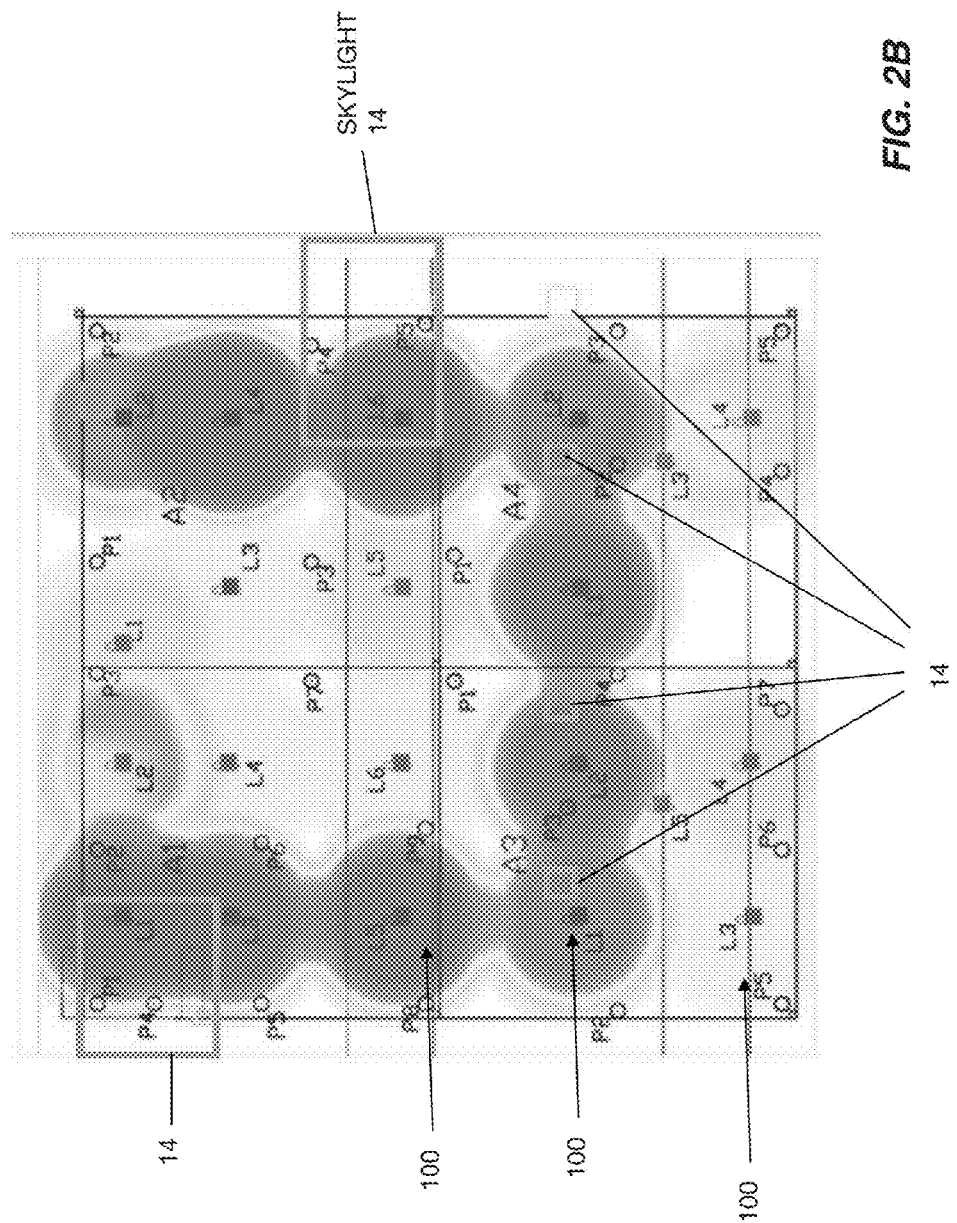
FIG. 2B shows one possible distribution of lighting fixtures and skylights in a typical warehouse environment, according to one embodiment of the present invention.

Following below are more detailed descriptions of various concepts related to, and embodiments of, inventive systems, methods and apparatus for intelligent lighting related to daylight harvesting, temperature monitoring, and power analysis. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. For instance, although FIGS. 2A and 2B illustrate an inventive lighting fixture 100 in a warehouse environment, those of skill in the art will readily appreciate that inventive lighting fixtures and techniques may be deployed in any suitable environment, including, but not limited to cold-storage facilities, office spaces, retail environments, sports venues, schools, residential areas, outdoor spaces, correctional facilities, and industrial facilities.

In many environments illuminated by intelligent lighting systems, real-time collection of ambient temperature data at many points provides valuable insight into the performance of other building systems, such as HVAC systems, machinery of various sorts, and high-volume chiller systems for cold storage environments. Intelligent lighting systems with integrated temperature sensing functionality can provide this real-time data stream to facilitate analysis, monitoring, and adjustment of these other building systems.

Many intelligent lighting systems also feature the ability to measure and analyze the energy used by the various parts of the lighting system. This measurement may occur at the facility level, at the level of an individual electrical circuit within the facility, or at the level of an individual light fixture within an electrical circuit. Measuring characteristics of energy and power used by individual light fixtures provides significant end-user benefits in both accuracy and granularity of analysis.

Embodiments of the present disclosure include sn apparatus for determining a first ambient light level at a first position (e.g., about one foot to about six feet from a floor). In an illustrative embodiment, the apparatus includes a sensor to measure a second ambient light level at a second position (e.g., at a lighting fixture) and a processor, which is operably coupled to the sensor, to determine the first ambient light level based on the second ambient light level. The processor may be further configured to determine a difference between the second ambient light level and a desired light level and, optionally, to determine a change in an illumination level to bring the first ambient light level into coincidence with the desired light level. In at least one example, the processor is further configured to adjust an illumination level to bring the first ambient light level into coincidence with the desired light level and to drive a light source, which is operably coupled to the processor, to provide illumination at the illumination level. An exemplary apparatus may also include a communications interface that is operably coupled to the processor and configured to provide an indication of the second ambient light level to a lighting fixture or another processor.

Other disclosed embodiments include methods of determining a difference between a first ambient light level and a desired ambient light level. Exemplary methods include measuring a second ambient light level at a second position, determining the first ambient light level based on the second ambient light level, and determining a difference between the first ambient light level and the desired light level. Further exemplary methods may also include adjusting an illumination level to bring the first ambient light level into coincidence with the desired light level.

Intelligent Lighting Fixtures

Figure 1A:
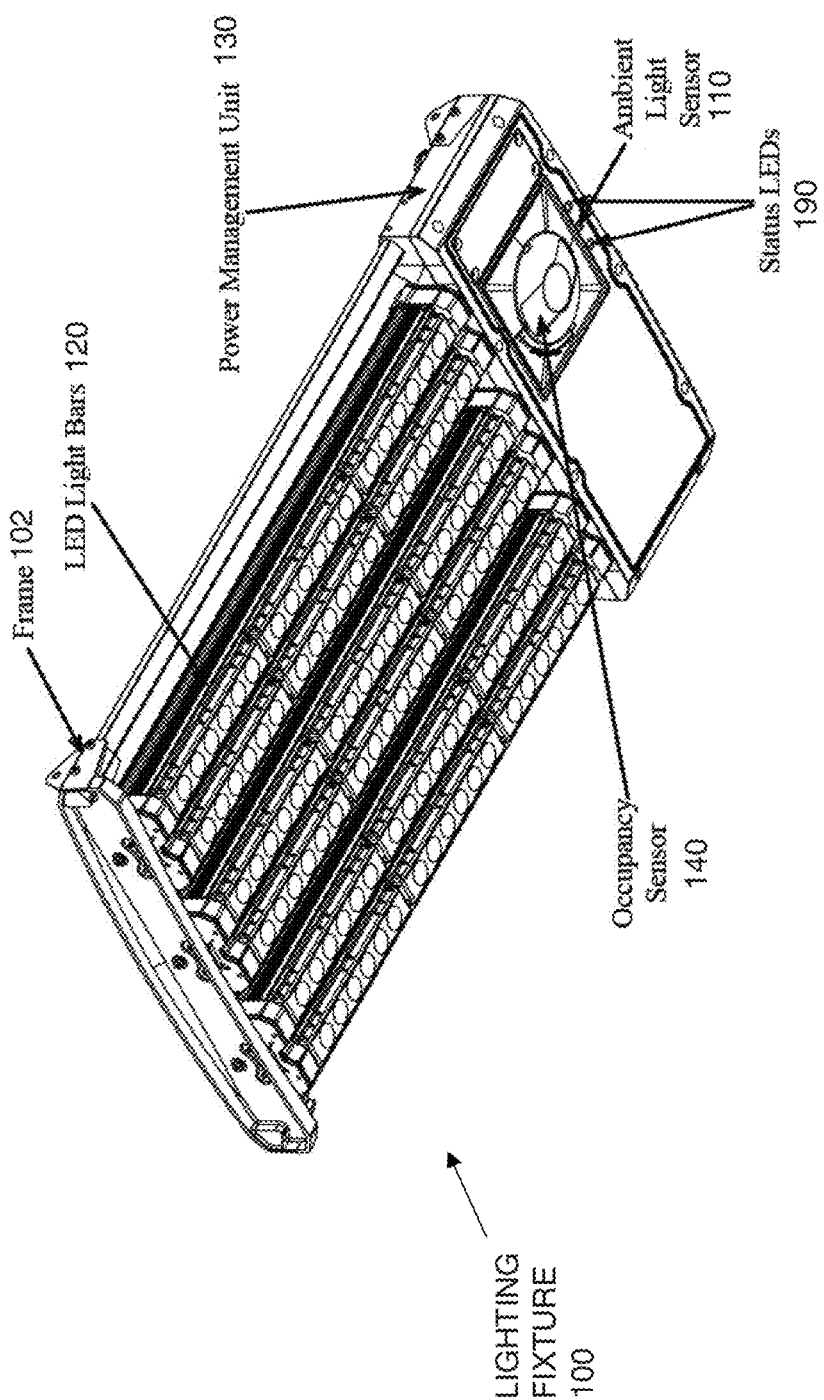
FIGS. 1A and 1B illustrate an intelligent lighting fixture with integrated ambient light sensing and occupancy sensing, according to one embodiment of the present invention.
Figure 1B:
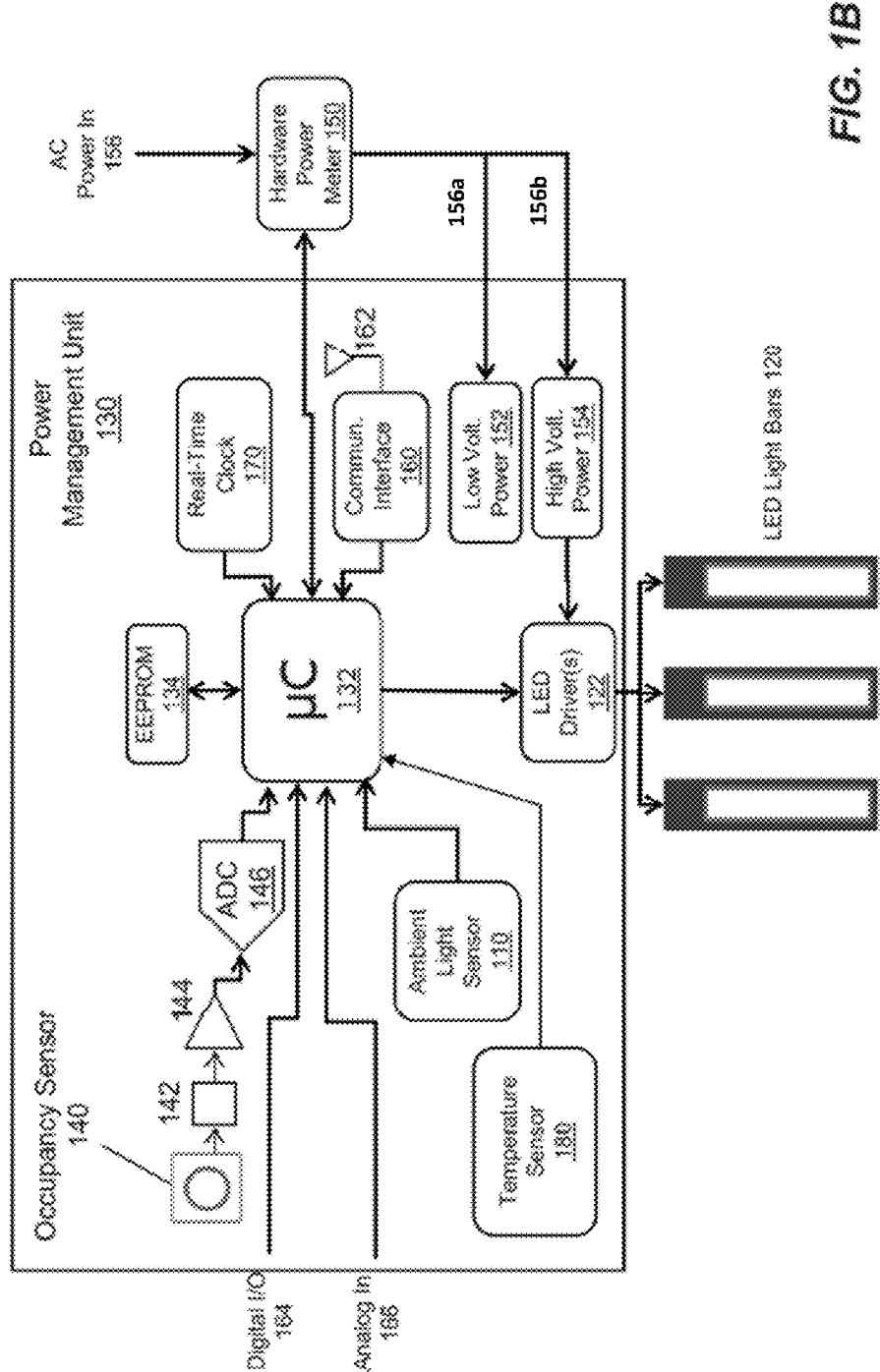

FIGS. 1A and 1B depict an illustrative lighting fixture 100 that illuminates an environment with light output from one or more light bars 120, each of which includes one or more light-emitting diodes (LEDs) that emit white light (and/or light at discrete wavelengths or bands in the visible spectrum) to illuminate the environment. The LEDs on the light bars 120 may be turned on and off individually in groups and/or set different to light levels as understood in the art. Similarly, the light bars 120 may be rotated or pointed so as to illuminate different sections of the environment, e.g., using a motor, gimbal mount, spindle, or other suitable mechanism. Those of skill in the art will also readily appreciate that other inventive lighting fixtures may include more or fewer light bars 120, longer or shorter light bars 120, and/or other light sources, such as incandescent bulbs, arc lamps, or fluorescent bulbs.

The LED light bars 120 are mounted to a frame 102 that also holds an ambient light sensor 110, a ballast interface or power management unit (PMU) 130, an occupancy sensor 140, and one or more status LEDs 190, which indicate the lighting fixture's current operating mode (e.g., active mode, sleep mode, service mode), whether or not the lighting fixture 100 needs to be serviced, whether the lighting fixture 100 is communicating with another device, etc. As shown in FIG. 1B, the lighting fixture 100 and/or the PMU 130 may include or be coupled to one or more LED drivers 122, a hardware power meter 150, a low-voltage power supply 152, a high-voltage power supply 154, a communications interface 160 coupled to an antenna 162, a real-time clock 170, and a temperature sensor 180. The lighting fixture 100 may include other components as well, such as a battery, back-up transmitter, "wired" communications interface, and additional sensors.

Each of these components is communicatively coupled to the PMU 130, e.g., via an appropriate bus or electrical connection, and may be a modular component that can be "hot swapped" or replaced in the field or integrated into either the lighting fixture 100 or the PMU 130. Alternatively, one or more of these components may be packaged separately and installed apart from the lighting fixture 100 or the PMU 130 and communicatively coupled to the lighting fixture 100 or PMU 130, e.g., via a wireless interface.

As described in greater detail below, the PMU 130 controls the illumination emitted by the LEDs on the LED light bars 120. FIG. 1B shows that the PMU 130 includes processor 132, such as a microprocessor, microcontroller, field-programmable gate array (FPGA), or other suitable processing device. The PMU 130 also comprises a non-transitory, nonvolatile memory 134, depicted in FIG. 1B as an electrically erasable programmable read-only memory (EEPROM). The memory 134 is communicatively coupled to the processor 132 (e.g., via an appropriate bus or connection) and stores processor-implementable instructions in the form of software and/or firmware for controlling the light output of the LED light bars 120. These instructions may take the form of rules that dictate how the processor 132 implements a state machine (described below) and rules for transitioning among states of the state machine.

The PMU 130 logs measurement signals (data) in the memory 134 from the ambient light sensor 110, occupancy sensor 140, hardware power meter 150, communications interface 160, and real-time clock 170 and may cause the state machine to transition from one state to another state based on these measurement signals. For instance, the processor 132 may cause the light output of the LED light bars 120 to change in response to inputs from the ambient light sensor 110, occupancy sensor 140, temperature sensor 180, and/or real-time clock 170 according to the instructions stored in the memory 134. These components, their respective functions, and the other components shown in FIG. 1B are described in greater detail below.

Ambient Light Sensors

The ambient light sensor 110 may be a photocell (e.g., an Intersil® ISL29102 Low Power Ambient Light-to-Voltage Non-Linear Converter) that monitors the level of ambient light at the sensor position or sensor height, $L_s$, emits an ambient light signal whose value (e.g., amplitude or phase), $V_s$, represents the amount of detected ambient light. The ambient light sensor 110 may include one or more optical elements (e.g., a lens) that direct ambient light onto one or more photosensitive elements, which transduce incident photons into a photocurrent, voltage, change in resistance, or other measureable electrical quantity. The ambient light sensor 110 may also include a circuit that provides automatic gain control—that is, the circuit controls the proportionality of the signal $V_s$ to the measured ambient light level $L_s$. If desired, the sensor gain can be tuned (either manually, automatically, or via remote control), e.g., to increase or decrease the ambient light sensor's sensitivity to ambient light. Similarly, the sensor circuit may include an offset that can be increased or decreased, e.g., to account for changes in fixed-pattern background illumination or noise.

In one example, an illustrative ambient light sensor 110 may employ processor-based tuning of the light sensor gain, offset, and threshold characteristics for improving the accuracy and precision of ambient light measurement. In some cases, the ambient light sensor 110 may be tuned after installation in a target environment to account for specific ambient light characteristics of that environment, such as the reflectivity of various surfaces, location and brightness of windows, skylights, or other light sources, or desired ambient light levels at various locations in that environment. The tuning process may be automated, or may involve substantial manual interaction. The tuning process may be conducted via a software user interface or via a special-purpose handheld device. The tuning process may be a one-time operation, or may be repeated (manually or automatically) to account for changes in the target environment.

An exemplary ambient light sensor 110 may respond to light in the visible, near infrared, mid-infrared, and far-infrared portions of the electromagnetic spectrum. For instance, the light sensor 110 may include two active regions: a first active region that senses visible light and a second active region that senses infrared light. Light sensors which measure both visible light and infrared light may output the visible and infrared readings separately to allow an intelligent lighting controller to distinguish between the ambient light provided by the sun (which contains a significant infrared component) and the light provided by an artificial light source (which may contain little or no infrared component). These readings may allow a controller (e.g., the state machine implemented in the PMU 130) to maintain target illumination levels and prevent undesired feedback loops in the PMU 130 from driving the daylight harvesting system as explained below.

Occupancy Sensors

The occupancy sensor 140 monitors the illuminated environment for the presence of people, vehicles, etc., and transmits an occupancy signal to the PMU 130 when it detects a person, vehicle, moving object, etc. in the illuminated environment. As understood by those of skill in the art, the occupancy sensor 140 may be a passive infrared (PIR) device that operates by sensing infrared radiation emitted by a person (or animal) in the environment. The occupancy sensor 140 may also emit radio-frequency or ultrasonic pulses and detect echo pulses reflected from objects or people in the environment. The occupancy sensor 140 may be configured to detect a person's location within the environment. It may also sense the number of people within the environment, their respective locations within the environment, and their respective trajectories within or through the environment.

As shown in FIG. 1B, the occupancy sensor 110 is operably coupled to the memory 134 (shown in FIG. 1B as an electrically erasable programmable read-only memory (EEPROM)) via a filter 142, an amplifier 144, a multi-bit analog-to-digital converter (ADC) 146, and a processor 132. The filter 144 removes noise from an analog occupancy signal generated by the occupancy sensor 140, and the amplifier boosts the filtered occupancy signal's strength. The ADC 146 digitizes the amplified occupancy signal, and the processor 132 uses the digitized occupancy signal to determine the light output of the LED light bars 120. The processor 132 may also store some or all of the digitized occupancy signal in the memory 134.

When the occupancy sensor 140 detects an occupancy event (e.g., a person entering a previously unoccupied room), it may increase the amplitude of its output (the occupancy signal). The processor 132 receives this occupancy signal and treats it as a state parameter indicative of the environment's occupancy state (e.g., occupied or unoccupied). If the occupancy signal indicates that the environment is occupied, then the processor 132 may send a signal to one or more LED drivers 122, which respond to the signal by changing the amount of light emitted by one or more LED light bars 120. As described below, the processor 132 may determine the desired output of the LED light bars based at least in part on a transfer function selected based on the occupancy signal itself as described in greater detail below.

The processor 132 may continue transmitting a "high" occupancy signal to the LED drivers 122 for as long as the occupancy sensor 110 detects an occupancy event, or it may send a second signal to the LED drivers 122 in response to detection of another change in occupancy (e.g., when the occupancy event ends). Alternatively, the processor 132 may simply send an occupancy signal periodically for as long the occupancy state of the environment does not change. At this point, the lighting fixture 100 enters a delay or timeout period, based on instructions stored in the memory 134 and timing data from the clock 170, during which the LED light bars 120 remain in the active state (or possibly transition to a state of intermediate activity, e.g., 50% illumination). Once the delay period has elapsed, as indicated by the change in state of a signal from the processor 132 and/or the LED driver 122, the LED light bars 120 enter an inactive state (e.g., they turn off or emit light at a very low level). As described below, the processor 132 may adjust the delay period and/or the light levels based on its analysis of logged sensor data.

Additional State Parameter Sensors

The lighting fixture 100 may also include additional state parameter sensors, each of which may be integrated into the PMU 130 or communicatively coupled to the PMU 130 via an appropriate communications interface. For instance, the lighting fixture 100 and/or the PMU 130 may include one or more temperature sensors 180 to sense the temperature of the lighting fixture 100, its components (e.g., the LEDs in the LED light bars 120), and/or the ambient temperature (the temperature of the air surrounding the lighting fixture 100). The lighting fixture 100 and/or the PMU 130 may also include an radio-frequency identification (RFID) sensor (not shown) for tracking RFID tags, a magnetometer, a camera, and any other sensor suitable for sensing a state of the environment. These additional sensors (not shown) may be coupled to the processor 132 via one or more digital input/output ports 164 and/or one or more analog input ports 166 or integrated into the lighting fixture 100 and/or the PMU 130.

The lighting fixture 100 also includes a real-time clock 170 that can also, optionally, be integrated into the PMU 130. The real-time clock 170 provides timing data (e.g., time-stamp information) on an as needed or periodic basis to the processor 132, which may store or tag the sensor data (including the ambient light and occupancy data) in the memory 134 with time stamps to indicate when the data was collected. In addition, the processor 132 may treat the time stamps as state parameters that indicate the time of day, day of the week, or day of the year. If the processor 132 determines from the time stamp that it is a weekend day or a holiday, it may determine that, for a given occupancy condition, the ambient light level should be lower that the ambient light level for a weekday at the same time. It may also determine that an intruder is present or that a security breach has occurred based on occupancy event data detected when the facility is closed. The real-time clock 170 may also be used to time or coordinate the sensor/lighting fixture delay period and to synchronize the PMU 130 to other devices, systems, and components on the same network and/or within the same environment.

Ambient Light, Occupancy Sensor Data, and Daylight Harvesting State Machines

The PMU 130 may use ambient light sensor data and/or occupancy sensor data to advance a software-configurable state machine governing the light fixture's behavior. More specifically, the PMU 130 may employ ambient light and occupancy measurements to "harvest" light from other sources, including the sun, to reduce the lighting fixture's light output and energy consumption. As part of this process, the PMU 130 may determine the light output from the light bars 120 using a "fixture-to-task" transfer function that maps the ambient light levels measured at the ambient light sensor 110 to the ambient light levels at "task position" or "task height," which correspond to the position or height at which a person working in the environment engages in tasks benefiting from illumination. For instance, task height may be the height at which a person uses his or her hands at a desk, in/on a rack, or holds a clipboard. In a warehouse, cold-storage facility, or office environment, task position or task height may about 1 ft to about 6 ft from the ground, e.g., about 3, 4, or 5 ft. An environment may include multiple task heights or task positions; for example, in a warehouse full of racks, there may be a different task position associated with each rack in the warehouse and/or each rack in a shelf.

In many situations, the ambient light sensor 110 may be located some distance from the task position or task height. For instance, the ambient light sensor 110 may be suspended from the ceiling as part of the fixture 100 in a high-bay or mid-bay installation or mounted to the wall as part of a separate sensor unit or PMU 130. As a result, the ambient light level at the sensor may be different than the ambient light level at the task position/height. To compensate for this, the PMU 130 may use a "fixture-to-task" transfer function, stored in the memory 134 (e.g., as a look-up table), that maps the measured ambient light signal from the ambient light sensor 110 to the estimated ambient light level at task position/height. The PMU 130 uses this transfer function, together with information about the lighting fixture's light output, to determine the amount of daylight illuminating the environment and the change in the lighting fixture's light output necessary to achieve a desired ambient light level at task height.

The PMU 130 may also update or calibrate the fixture-to-task transfer function based on closed-loop feedback from the ambient light sensor 110 and the PMU 130. In some cases, for example, the processor 132 may also log ambient light sensor data and information about the lighting fixture's light output in the memory 134 on a periodic basis to track changes in the environment's reflectivity over days, weeks, months, or years. It may also log ambient light sensor data in the memory 134 immediately before and after a change in the lighting fixture's light output. From these measurements, the PMU 130 may determine that the task-position ambient light level has not increased by the desired amount and may change the lighting fixture's light output and the transfer function's scaling accordingly.

Consider, for example, a lighting fixture 100 that illuminates the warehouse environment shown in FIGS. 2A and 2B, with racks 12 arranged on a floor 10 in an open (and possibly cavernous) space. One or more skylights 14 (FIG. 2B) allow sunlight to illuminate corresponding sections of the warehouse. The amount of sunlight entering the warehouse varies with the time of day (angle of the sun) and the weather. For instance, a passing cloud may cast a shadow over the skylight, reducing the amount of sunlight that enters the warehouse on an otherwise sunny day. The amount of sunlight entering the warehouse may also vary with the season, with more sunlight in the summer and less in the winter, and the cleanliness of the skylights 14. Light from outside artificial sources, such as neon signs and security fixtures, as well as obstructions, such as other neighboring buildings, may also affect the amount of ambient light admitted by the skylights 14.

Variations in the amount of light coming through the skylights 14 affects the ambient light level at task height $L_f$, which may be about three feet above the floor 10. Task height represents the height at which a worker in the warehouse performs day-to-day tasks, including inspecting items (and tags on items), moving items on and off shelves on the racks, turning switches on and off, and working with his or her hands. Obstructions scattered throughout the warehouse may attenuate, scatter, or reflect light from skylights 14, so the ambient light level at task height may not necessarily be the same as the ambient light level at other distances from the floor. The ambient light level at task position/height may also vary with (lateral) position on the floor (distance from a rack 12/skylight 14/window). For instance, a rack 12 may shield one area of the warehouse floor 10 from light coming in through a particular skylight 14, but not another area.

One or more intelligent lighting fixtures 100 illuminate the warehouse environment. The lighting fixtures 100 may be mounted from the ceiling of the warehouse and arrayed in a semi-regular grid (e.g., along aisles between racks) as shown in FIGS. 2A and 2B, with the exact number and arrangement of lighting fixtures 100 depending on the desires and needs of the property manager and users. In some embodiments, the lighting fixtures 100 are communicatively coupled to each other ("networked together") via wireless or wired communication channels. For instance, the fixtures 100 may exchange information with each other via wireless radio-frequency links, pulse-width modulated (PWM) infrared links, Ethernet links, wired link, or any other suitable communications link. (In some cases, the ambient light sensor 110 and/or occupancy sensor 140 may receive data from other sensors/PMUs/fixtures via an infrared data link.) The fixtures 100 may also be communicatively coupled to a server (not shown) or other processor that collects and processes usage and environmental data collected by sensors on the fixtures 100.

In operation, the PMU 130 in each lighting fixture 100 measures the ambient light level on a continuous or periodic basis and senses the presence (or absence) of occupants in the environment. Each PMU 130 also monitors aspects of the light emitted by its fixture 100, such as the intensity, direction, and pattern of the beam(s) projected by the LED light bars 120 into the environment. For instance, the PMU 130 may compute the intensity of the emitted beam based on a measurement of the power drawn by the LED driver circuit 122, the fixture's temperature and age, and information stored in the memory 134 about the operating characteristics of the LED light bars 120. The PMU 130 uses this information, along with ambient light level measurements and calibration data about the ambient light sensor 110, to determine what fraction of the measured ambient light is light emitted by the LED light bars 120 and what fraction comes from other light sources, such as the sun. It may also measure the power spectral density of the ambient light to determine how much sunlight is present, if any.

If the PMU 130 determines that the amount of sunlight is increasing, it may cause the lighting fixture 100 to emit less light so as to maintain a desired ambient illumination level. Similarly, if the PMU 130 determines that the amount of sunlight is decreasing, it may cause the lighting fixture 100 to emit more light so as to maintain the desired ambient illumination level. The PMU 130 may also cause the lighting fixture 100 to change the beam pattern in response to an indication that one portion of the environment is brighter than another portion of the environment, e.g., because the sun is shining through one window or skylight but not another. For instance, the PMU 130 can selectively turn on or off LEDs in the LED light bars 120; cause some LEDs to emit more light than others; modulate the transparency, focus, or pattern of an electro-active optical element (e.g., a spatial light modulator) placed over some or all of the LEDs in a light bar 120; or actuate a motor that rotates one or more of the LED light bars 120.

Occupancy-Based State Machine Employing a Fixture-to-Task Transfer Function

In at least one embodiment, an inventive PMU 130 implements an occupancy-based state machine that uses the "fixture-to-task" transfer function described above to provide a desired task-position ambient light level for a given occupancy state. Each occupancy state may have associated with it a desired task-position ambient light level, or target illumination level. In operation, the occupancy sensor 140 detects a change in occupancy state and reports the change to the PMU 130, which advances the state machine from one state to another (e.g., unoccupied to occupied) based on the change. (It may also advance the state machine based on signals from a timer, such as the real-time clock 170.) The PMU 130 determines the target level for the new state and servos the lighting fixture's light output using ambient light sensor data and the "fixture-to-task" transfer function to compensate for changes in daylight levels, environmental reflectivity, etc.

Figure 3A:
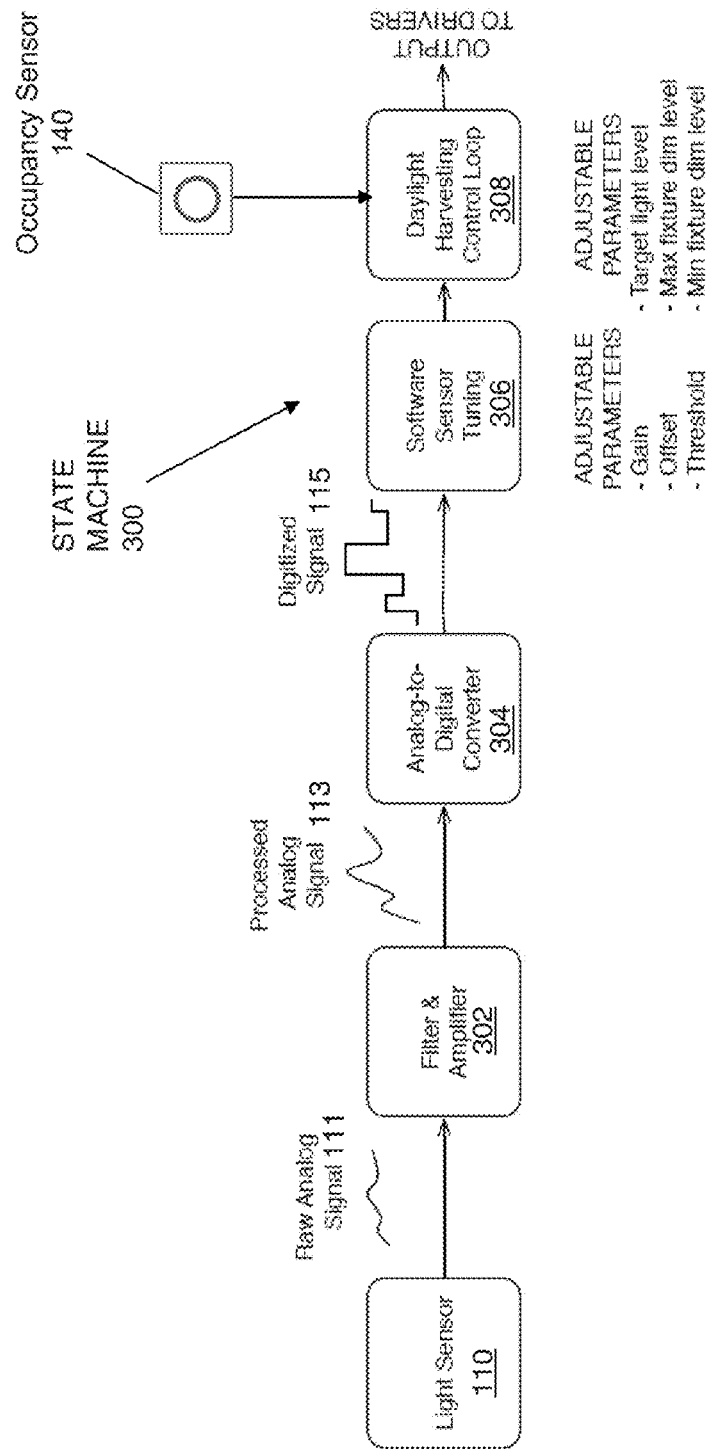
FIG. 3A is a diagram of a tunable ambient light sensor feeding directly into a software-configurable daylight harvesting control state machine system, according to one embodiment of the present invention.

FIG. 3A shows a state machine 300 that maps the measured ambient light level to a desired ambient light level according to the "fixture-to-task" transfer function described above. When the sensor value $V_s$ increases (e.g., in response to an increase in the ambient light level), the state machine may instruct the PMU 130 to cause the LED light bars 120 to emit less light or to turn off completely. When the sensor value $V_s$ decreases (e.g., in response to a decrease in the ambient light level), the state machine may instruct the PMU 130 to cause the LED light bars 120 to turn on or emit more light. The state machine 300 may also record and analyze readings from the ambient light sensor 110 to "learn" appropriate light level settings for given sensor readings $V_s$ as described below.

FIG. 3A shows that the ambient light sensor 110 provides a raw analog signal 111 representing the measured ambient light level $L_s$ at the sensor to a filter and amplifier 302, which together transform the raw analog signal 111 into a processed analog signal 113 by removing spurious spectral components from the signal and boosting the signal amplitude. An analog-to-digital converter (ADC) 304 coupled to the filter and amplifier 302 converts the processed analog signal 113 to a multi-bit (e.g., 12-bit or 16-bit) digitized signal 115. The ADC 304 provides the digitized signal to the state machine 300, which implements a sensor tuning software module 306 and a daylight harvesting control loop 308 to analyze and respond to the digitized signal 115 as well as to signals from the occupancy sensor 140 and from other signal sources (e.g., the real-time clock 170).

The sensor tuning software module 306 may also adjust the gain, offset, and threshold in response to measurements that map the ambient light level $L_f$ at task height to the instantaneous value $V_s$ of the digitized signal 115. For instance, the sensor tuning software module 306 may change the sensor gain in response to changes in the sensor's performance or changes in the environment. Painting the walls of the environment or moving boxes on the racks 12 may cause the reflectivity to increase or decrease by a known or measureable amount. Tuning the sensor gain, offset, and/or threshold compensates for this change in reflectivity.

Figure 3B:
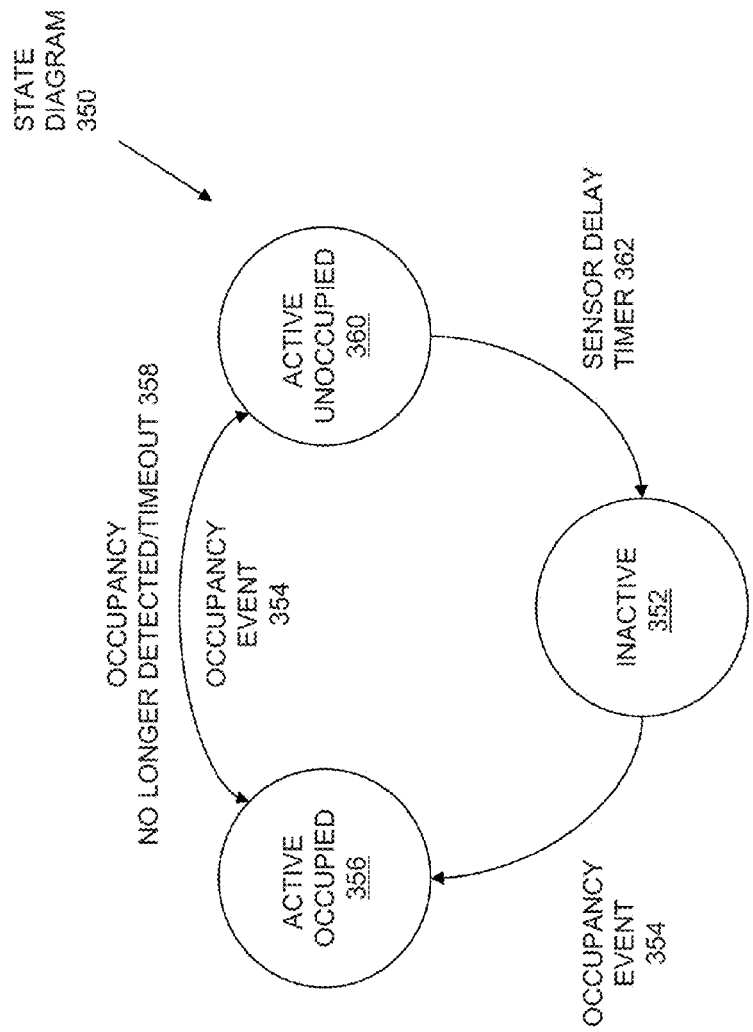
FIG. 3B is a state diagram for a state machine suitable for implementation by the daylight harvesting control state machine system of FIG. 3A.

FIG. 3B illustrates a state diagram 350 for the state machine 300 implemented by the PMU 130. In some embodiments, the daylight harvesting control loop 308 determines and controls the light provided by the lighting fixture 100 by transitioning among the states shown in the state diagram 350. For instance, the state machine's default state may be an inactive state 352 in which the lighting fixture 100 emits no light or only a minimal amount of light, e.g., for safety purposes. Upon receiving an indication of an occupancy event 354 (e.g., the entrance of a person into the environment) from the occupancy sensor 140, the control loop 308 transitions the lighting fixture 100 from the inactive state 352 to an active occupied state 356. For instance, the control loop 308 may increase the lighting fixture's light output to provide a target illumination level (stored in the memory 134) for the active occupied state 356 according to ambient light sensor data and the fixture-to-task transfer function (also stored in the memory 134).

The lighting fixture 100 remains in the active occupied state 356 so long as the environment remains occupied. In the active occupied state 356, the control loop 308 may servo the light output setting about a desired (e.g., constant) value of the ambient light level $L_f$ at task height using proportional-integrative-derivative (PID) control with gain coefficients tuned to provide the desired response. Those of skill in the art will readily appreciate that other forms of control (e.g., proportional control or proportional-derivative control) may be employed as well.

In some environments, and with some sensors 110, this can be accomplished when the control loop 408 that implements a "laggy follower," i.e., PID control where the "proportional" gain coefficient is equal to the reciprocal of the error term. The control loop 308 may also provide an "asymmetric" response to changes in the ambient light levels: it may increase the light output setting quickly in response to a decrease in the ambient light level and decrease the light output gradually in response to an increase in the ambient light level. The type of response may also vary with user commands, the time of day, the time of year, the weather, the presence or absence of people in or near the illuminated environment, etc. Similarly, the desired ambient light level at task height $L_f$ may be constant or may vary in response to user commands, the time of day, the time of year, the weather, the presence or absence of people in or near the illuminated environment, etc.

When occupancy is no longer detected (358), the control loop 308 transitions the lighting fixture 100 from the active occupied state 356 to an active unoccupied state 360, e.g., by starting a sensor delay timer 362 controlled by the real-time clock 170. The lighting fixture 100 remains in the active unoccupied state 360 until the sensor delay timer 362 elapses, in which case the control loop 308 transitions the lighting fixture 100 to the inactive state 352, or the occupancy sensor 140 detects another occupancy event 354, in which case the control loop 308 transitions the lighting fixture 100 to the active occupied state 356.

Transfer Functions Mapping Ambient Light Levels to Light Outputs

As explained above, the PMU 130 uses the fixture-to-task transfer function to map the measured ambient light level to an estimated ambient light level, and a state-to-target transfer function to map the fixture's current operating state to a desired ambient light level for each state of the environment. These transfer functions may be stored in look-up tables as one or more combinations of measured ambient light level(s), current lighting fixture light output(s), and change(s) in lighting fixture light output to achieve a particular ambient light level. In one example, the PMU 130 determines the amount of light provided by other sources (the amount of "daylight") by subtracting a scaled or calibrated measure of the lighting fixture's light output from the measured ambient light level. It may also determine the amount of daylight by measuring the power spectral density of the ambient light and decomposing the measured power spectral density into the weighted superposition of the power spectral densities of the sun and the lighting fixture.

The PMU 130 also determines the target ambient light level, or desired illumination level, based on an occupancy signal from the occupancy sensor 140 and, optionally, time values from the real-time clock 170 or another time source. For instance, the target illumination level may be highest during daytime hours when the environment is occupied, high during nighttime hours when the environment is occupied, and low when the environment is unoccupied. If the target ambient light level is higher than the measured ambient light level, or if the amount of daylight decreases, the PMU 130 increases the light output of the lighting fixture 100. If the target ambient light level is lower than the measured ambient light level, or if the amount of daylight increases, the PMU 130 decreases the light output of the lighting fixture 100.

The PMU 130 also updates the target ambient light level if the environment's state changes, e.g., according to the state diagram 350 in FIG. 3B. In some examples, the memory 134 stores different transfer functions (look-up table) for different environmental configurations. These environmental configurations may be defined in terms of user input (e.g., via the communications interface 160) and/or state parameters that are sensed or measured by the various sensors integrated into or communicatively coupled to the PMU 130 (e.g., the number of people or objects within the ambient light sensor's field of view). For instance, the presence of many pallets in the environment may reduce the environment's reflectivity, which in turn affects the transfer function. Likewise, weekly (or monthly) cleaning may increase the environment's reflectivity. Other factors that may affect the fixture-to-task transfer function include but are not limited to: the number of occupants within the environment, spatial distribution of occupants within the environment, activity (motion) of the occupants, light output of the lighting fixture, time of day, day of the week, time of the year, ambient temperature, fixture temperature, operational status of the lighting fixture, operational status of other lighting fixtures in the environment, and age of the lighting fixture.

Figure 4:
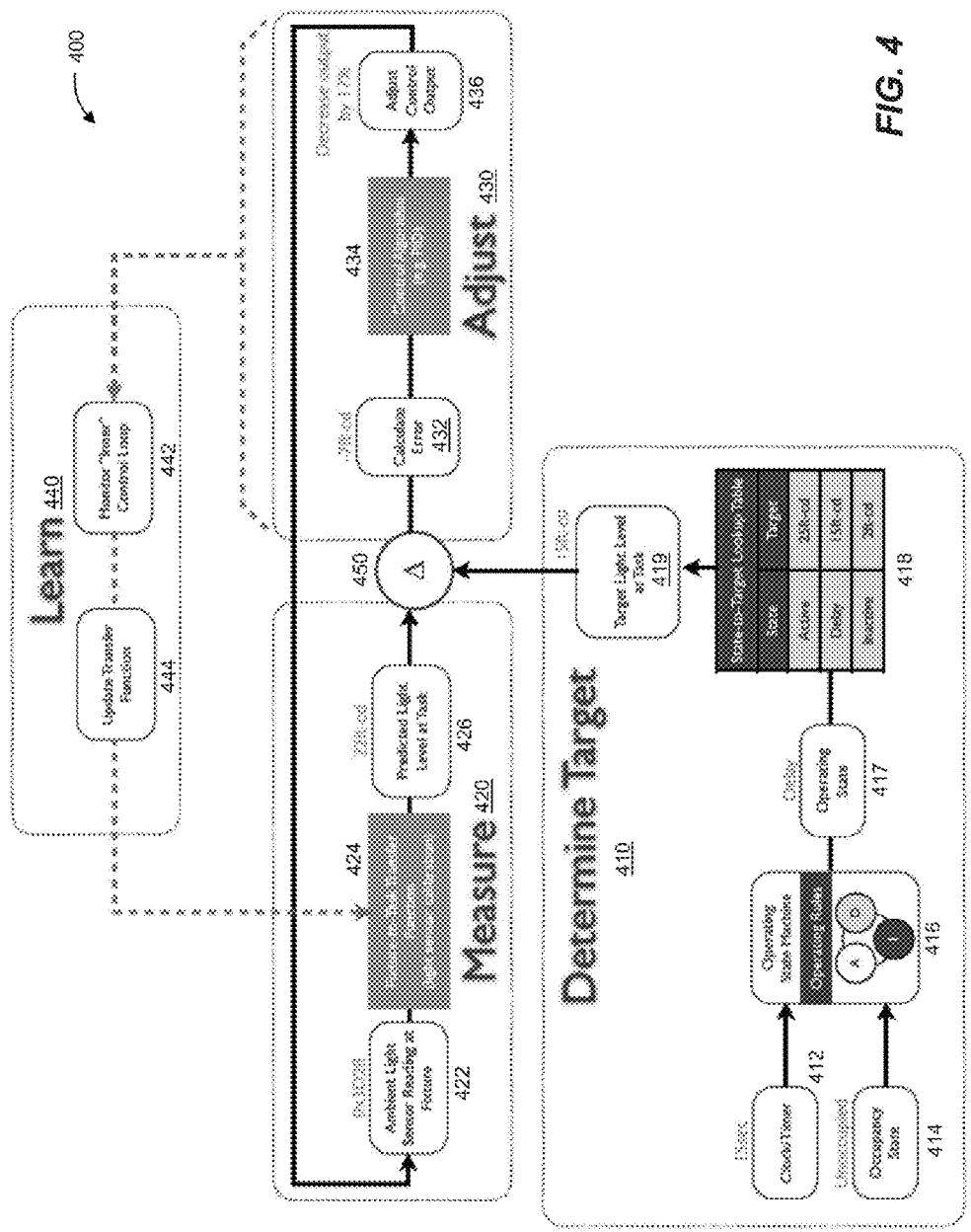
FIG. 4 is a flow diagram that illustrates how to select and maintain a desired ambient light level using a transfer function relating the ambient light level at task height $L_f$ to the sensor value $V_s$, according to one embodiment of the present invention.

FIG. 4 is a flow chart that illustrates a process 400 executed by the PMU 130 to select, use, and update a fixture-to-task transfer function 424 that maps measured ambient light levels to estimated ambient light levels based on the state of environment illuminated by the lighting fixture 100. The process 400 includes four sub-processes: an occupancy-based state machine sub-process 410; an ambient light level sub-process 420; an adjustment sub-process 430; and a "learning" sub-process 440. Together, sub-processes 420 and 430 form a first (inner) closed feedback loop that servos the light output to maintain the target illumination level, and sub-processes 420, 430, and 440 form a second (outer) closed feedback loop to adjust the transfer function 424.

In the occupancy-based state machine sub-process 410, the occupancy sensor 140 senses or measures the occupancy state 414 of the environment. The PMU 130 combines this occupancy data with timer data 412 from the real-time clock to advance an operating state machine 416 from one state to another according to operating rules stored in the memory 134. (The PMU 130 may also use information about temperature, time of day, day of the week, operational status of the lighting fixture, etc. to advance the state machine.) For instance, the PMU 130 may receive an occupancy signal from the occupancy sensor 140 indicating that the environment has transitioned from an unoccupied state to an occupied state. The PMU 130 determines the environment's operating state 417 and selects a target illumination level 419 at task height corresponding to the operating state 417 from a look-up table (LUT) 418 stored in the memory 134.

In the ambient light level sub-process 420, which may occur before, during, or after execution of the state machine sub-process 410, the PMU 130 receives a measurement of the ambient light level 422 (possibly in hexadecimal form) from the ambient light sensor 110 and records this measurement in the memory 134. (The PMU 130 may log the state parameters in the memory 134 as well.) It maps this measured ambient light level at one location to the estimated ambient light level at the task location according to the fixture-to-task transfer function 424, possibly by determining the amount of daylight as well. This mapping yields a predicated task-height ambient light level 426, which the PMU compares to the target illumination level 419 at task height (comparison 450).

In the adjustment sub-process 430, which may run continuously or iteratively (e.g., periodically), the PMU 130 calculates the error 432 between the predicted ambient light level 434 at task height and the target illumination level 419 at task height (comparison 450). It uses a control loop 434, such as a proportional-integral-derivative (PID) control loop, to adjust the output of the lighting fixture 100 (step 436) so as to provide the desired amount of illumination. As understood by those of skill in the art, the PID control loop 434 generates a weighted sum of the present error, the accumulation of past errors, and a prediction of future errors to generate an adjustment amount to the lighting fixture's light output so as to keep the measured ambient light level 322 at a level corresponding to the target illumination level 419 at task height.

The "learning" sub-process 440 involves monitoring the inner control loop (sub-processes 420 and 430) (step 442) and updating the fixture-to-task transfer function (step 444), e.g., using logged sensor data and/or the calibration routines described below. In this sub-process 440, the PMU 130 compares the measured ambient light level 422 to the target ambient light level 419, e.g., on a continuous, periodic, or intermittent basis. If the PMU 130 determines that the changed ambient light level matches the target ambient light level, it resumes monitoring the ambient light level and the occupancy. Otherwise, if the PMU 130 determines that the changed ambient light level does not match the target ambient light level, it adjusts the transfer function (step 444) to compensate for the discrepancy between the measured and target values. For example, if the changed ambient light level is lower than the target ambient light level, the PMU 130 may adjust the transfer function so as to increase the lighting fixture's light output for the state of the environment, the amount of daylight, and the measured ambient light level. Likewise, if the changed ambient light level is higher than the target ambient light level, the PMU 130 may adjust the transfer function so as to decrease the lighting fixture's light output for the state of the environment, the amount of daylight, and the measured ambient light level. The PMU 130 may use the sensor measurements logged in the memory 134 to determine how much to change the transfer function and, optionally, to determine whether or not the discrepancy between measured and target light levels is spurious. If the discrepancy is spurious, the PMU 130 may not adjust the transfer function.

The ambient light level measurements 422 and occupancy state measurements 412 may occur continuously or at discrete intervals. For instance, they may occur periodically (e.g., once per second), aperiodically, and/or on demand. They may occur more frequently when the environment is likely to be occupied, e.g., during operational hours. They may be synchronized or may occur asynchronously (e.g., the ambient light level measurements 422 may occur more frequently than the occupancy state measurements 412).

Mapping Sensor Readings to Ambient Light Levels at Task Height

Referring again to FIG. 3A, the state machine 300 may also map the value $V_s$ of the sensor signal to the amount of ambient light present at task height $L_f$, which may be about three feet off of the floor 10, and adjusts the light output of the LED light bars 120 based on the amount of ambient light present at task height $L_f$. The state machine 300 may use the sensor reading $V_s$ to keep $L_f$ at desired level under some or all ambient lighting conditions. To do this, the state machine 300 exploits the relationships among the ambient light level $L_s$ and $L_f$ and the sensor reading $V_s$ illustrated in FIGS. 5A-5C. In some cases, the state machine 300 maps the sensor reading $V_s$ to the ambient light level at the sensor $L_s$, and the ambient light level at the sensor $L_s$ to the ambient light level at task height $L_f$. These mappings may vary from sensor to sensor, and from environment to environment as explained below.

Figure 5:
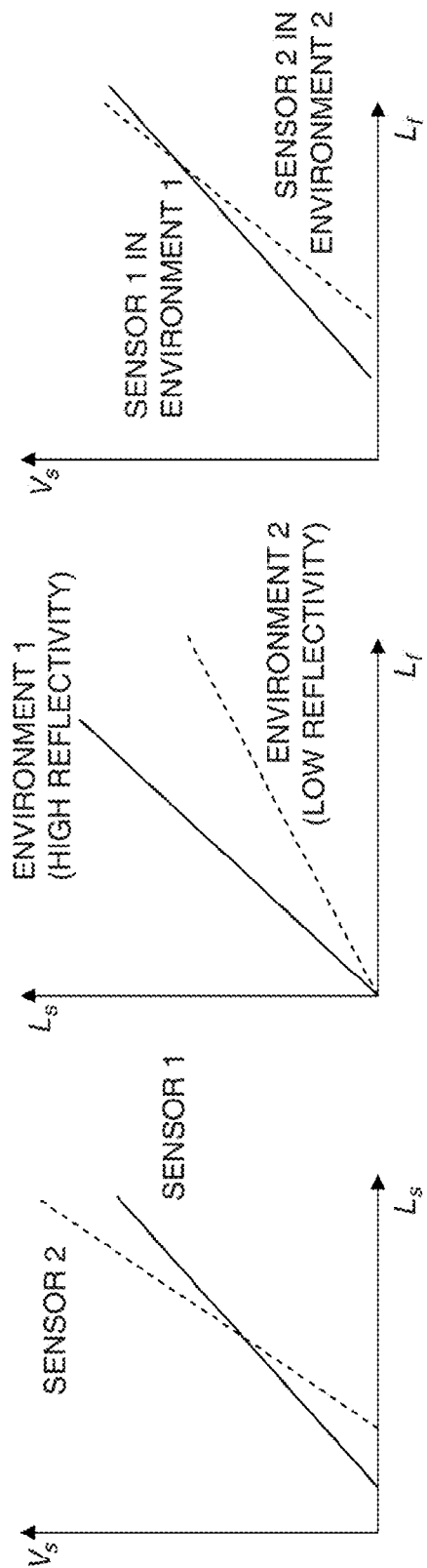
FIG. 5A is a plot of the sensor value $V_s$ versus the ambient light level at the sensor position $L_s$ for different environments and lighting fixtures, according to one embodiment of the present invention.
FIG. 5B is a plot of the ambient light level at task height $L_f$ versus ambient light level at the sensor position $L_s$ for different environments and lighting fixtures, according to one embodiment of the present invention.
FIG. 5C is a plot of a transfer function that maps the ambient light level at task height $L_f$ to the sensor value $V_s$ for different environments and lighting fixtures, according to one embodiment of the present invention.
Figure 6:
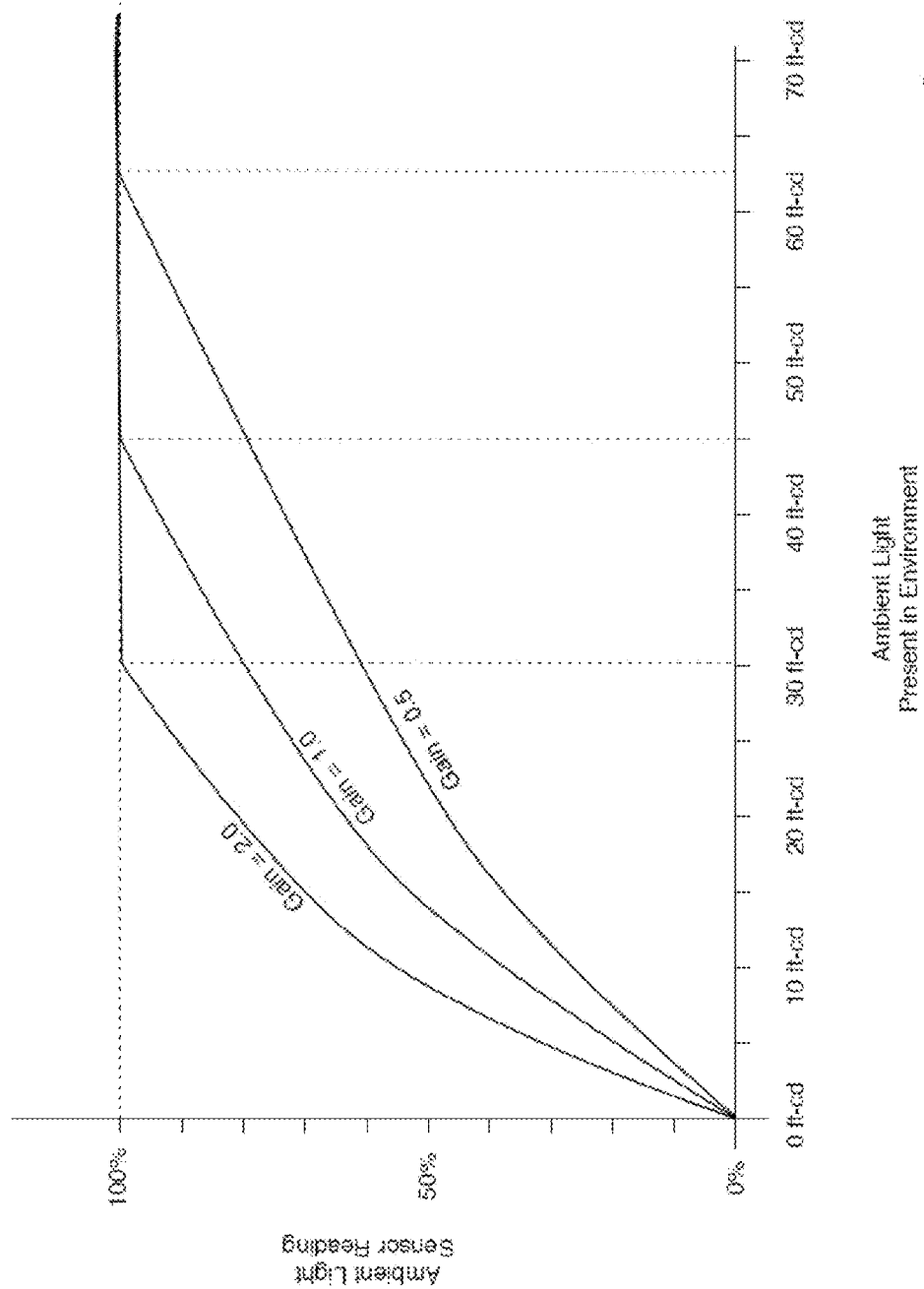
FIG. 6 illustrates a relationship between ambient light present in an environment and ambient light sensor signal value, for several values of a typical "tuning" parameter (e.g., sensor gain), according to one embodiment of the present invention.

FIG. 5A shows the sensor reading $V_s$ as a function of the ambient light level $L_s$ measured by two different exemplary ambient light sensors 110 (sensors 1 and 2). Sensors 1 and 2 responds differently to the same amount of ambient light $L_s$ due to variations in their gain, offset, and threshold setting as well differences in their manufacturing. For instance, the optical coupling between the lenses and the sensing elements may be lossier in one sensor than in the other, possibly due to imperfections in the lenses or index-matching fluid used to optically mate the lenses to the sensing elements. In addition, each sensing element may generate a different amount of current (or voltage, or change in resistance, etc.) in response to a given irradiance. If desired, the differences between sensors can be reduced by tuning the gain, offset, and threshold of each sensor appropriately, e.g., using the gain curves shown in FIG. 6. Alternatively, the relationship between the sensor reading $V_s$ and the ambient light level $L_s$ for a given sensor can be measured (e.g., before or after installation) and used when processing sensor readings $V_s$.

FIG. 5B illustrates how the ambient light level at the sensor $L_s$ relates to the ambient light level $L_f$ at task height for two notional environments—in this case, a more reflective environment (environment 1) and a less reflective environment (environment 2). In both environments, light reflected or scattered off the floor and other surfaces propagates from task height to the ambient light sensor 110. The color, roughness, and orientation of the surfaces within the environment affect how much light scatters or reflects off the surfaces in the environment to the ambient light sensor 110. The proximity of the ambient light sensor 110 to windows, skylights, and other light sources may also affect the relationship between the ambient light level at the sensor $L_s$ relates to the ambient light level $L_f$ at task height.

Plotting the ambient light level $L_s$ at the sensor versus the ambient light level $L_f$ at task height yields the curve shown in FIG. 5B. Multiplying the values plotted in FIG. 5B (Ls as a function of $L_f$) with the values plotted in FIG. 5A ($V_s$ as a function of $L_s$) yields the values plotted in FIG. 5C ($V_s$ as a function of $L_f$). FIG. 5C shows how the sensor reading $V_s$ relates the ambient light level at task height $L_f$. The state machine 300 and PMU 130 may use data representing this relationship to determine how much light the lighting fixture 100 should emit to keep the ambient light level at task height $L_f$ at a desired level given a sensor reading. For instance, the state machine 300 may access a look-up table in the memory 134 that includes combinations of $V_s/L_f$ values and corresponding illumination settings for desired values of ambient light level at task height $L_f$.

Manual Transfer Function/Ambient Light Sensor Calibration

In some cases, the relationship shown in FIG. 5B may be determined empirically after installation of the ambient light sensor 110 in the environment. During commissioning of the lighting fixture 100, for example, a user may set all ambient light to be constant or choose a moment when the ambient light level is relatively constant. Next, the user sets the fixture 100 to a known brightness level (e.g., 100% illumination) and measures the ambient light level $L_f$ at task height with a separate sensor, such as a handheld photodetector, while the ambient light sensor 110 measures the ambient light level $L_s$ at the sensor. Then the user sets the fixture 100 to a different brightness level (e.g., no illumination) and measures the ambient light level $L_f$ at task height with the separate sensor while the ambient light sensor 110 measures the ambient light level $L_s$ at the sensor. The user may measure the ambient light level $L_f$ at task height as many times and at as many different illumination levels as desired. Additional measurements may be averaged or used to provide more points for curve-fitting confidence. (Alternatively, the sensor 110 can infer the ambient light level at task height $L_f$ from measurements of light levels at sensor height $L_s$ as described below.)

Automatic Transfer Function/Ambient Light Sensor Calibration

Figure 7A:
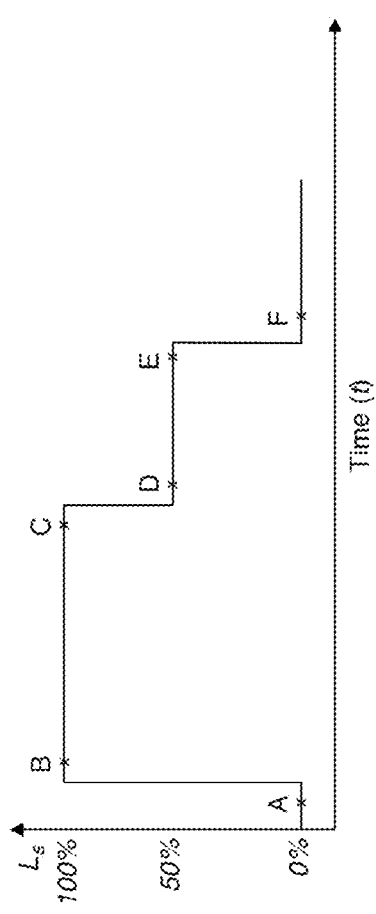
FIG. 7A is a plot that shows pairs of sensor readings and light outputs as a function of the light output $L_f$ of an intelligent lighting fixture, according to one embodiment of the present invention.
Figure 7B:
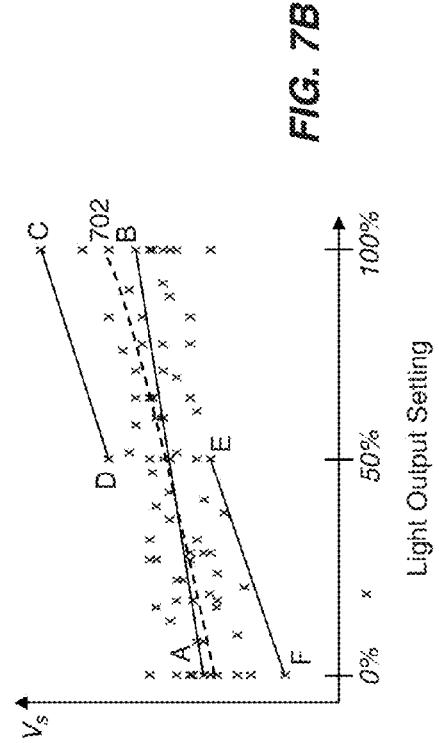
FIG. 7B is a scatter plot of sensor values and light outputs, including those shown in FIG. 8A, for an intelligent lighting fixture, according to one embodiment of the present invention.

FIGS. 7A and 7B illustrate an alternative process for determining the relationship between sensor reading $V_s$ and ambient light level at task height $L_f$ for a given ambient light sensor 110 in a given environment. A user installs the lighting fixture 100, then sets it to operate in response to user commands or according to default settings derived from estimates or a priori knowledge of the sensor/environment relationship. As the lighting fixture 110 operates, it changes the illumination levels in response to occupancy events (e.g., it may turn on when someone enters the environment and turn off or dim after a timeout period following the most recent occupancy event), the time of day (e.g., it may turn off or dim automatically at night), and the ambient lighting conditions. Just before and just after the lighting fixture 100 switches between lighting levels (dims or brightens), the ambient light sensor measures the ambient lighting level $L_s$. The fixture 110 records the measurements of ambient lighting levels $L_f$ as a function of fixture light output in a memory.

FIG. 7A shows six pairs of such measurements: A and B, C and D, and E and F. The sensor 110 makes each pair of measurements quickly, so the amount of light detected from sources other than the lighting fixture 110 remains relatively constant over each measurement interval. As a result, subtracting the "low" measurement (e.g., measurement A) from the "high" measurement (e.g., measurement B) in each pair of measurements yields the change in sensor reading $V_s$ for a given change in the light output setting of the lighting fixture 100.

Plotting these measurements (along with many other before-and-after measurements) yields the scatter plot shown in FIG. 7B. Because the change in the light output setting is known (the PMU 130 commands the change in light output setting), each pair of measurements can be used to determine a slope that represents the sensor's response to changes in the light output setting, which correlates with the ambient light level $L_s$. Fitting a curve 702 to the plotted points (e.g., using a simple linear fit or a least squares fit to a polynomial function) yields the relationship between the sensor reading and the light output settings (and/or ambient light levels $L_s$). The state machine 300 may store indications of this relationship in memory as points in a LUT or coefficients of an equation that defines the shape of the curve 702.

The relationship between sensor readings $V_s$ and light output settings represented by the curve 702 in FIG. 7B can be used to map the sensor readings $V_s$ to the ambient task-height ambient light level $L_f$ based on one or more measurements of the task-height ambient light level $L_f$ for a given sensor reading $V_s$. In one example, the state machine 300 uses a single measurement of the task-height ambient light level $L_f$ for a given sensor reading $V_s$ to fix the curve 702 with respect to a desired ambient light level at task height. The pairs of sensor readings provide the slope m of the curve 702, and the ambient light measurement provides the offset b, to provide a solution to the equation $L_f=mV_s+b$. The state machine 300 may then servo the light output setting about the corresponding sensor reading $V_s$ to provide the desired level of illumination.

The state machine 300 may continue to measure and record pairs of sensor readings $V_s$ as the lighting fixture operates, e.g., on a periodic basis, an as-needed or as-desired basis, or even every time the lighting output setting changes. The state machine 300 can use these additional measurements to update the sensor reading/light output setting relationship represented by the curve 702 in FIG. 7B and to adjust the light output setting due to degradations or other changes in the sensor's behavior or the fixture's behavior caused by age, temperature, and other factors. If the state machine 300 has a model of the relationship between the ambient lighting level at task height $L_f$ and the sensor reading $V_s$ (i.e., a model of the transformation that maps $V_s$ to $L_f$), it may also be able to update its model in response to changes in the environment that affect the sensor readings $V_s$. For instance, painting the walls of a warehouse or moving products around inside a warehouse may increase the reflectivity, which, in turn, increases the amount of ambient light at task height for a given light output setting and a given amount of sunlight. This causes the average sensor reading $V_s$ to increase for a given light output, all other factors being equal. The state machine 300 may alert the PMU 130 to such a change, and the PMU 130 may adjust the light output settings accordingly.

The state machine 300 may utilize ambient light sensor data alone or combined with occupancy sensor data; for instance, it may be a software-configurable state machine 300 that governs the behavior of one or more individual light fixtures 100 based on a combination of occupancy and ambient light data. This software-configurable control may, for example, allow a user to specify one daylight harvesting profile to be used when an occupancy sensor indicates the presence of a person or vehicle in an area of interest and another daylight harvesting profile to be used when the occupancy sensor indicates that the area is empty or inactive. In this example, the "inactive" daylight harvesting profile may be configured to save more energy than the "active" profile. If no occupancy sensor data is available, a lighting control system which uses ambient light sensor data may allow a user to specify a target illumination level as well as maximum and minimum fixture dimming levels, among other user-specifiable operating parameters.

Performance with Transfer-Function-Based Daylight Harvesting

Figure 8:
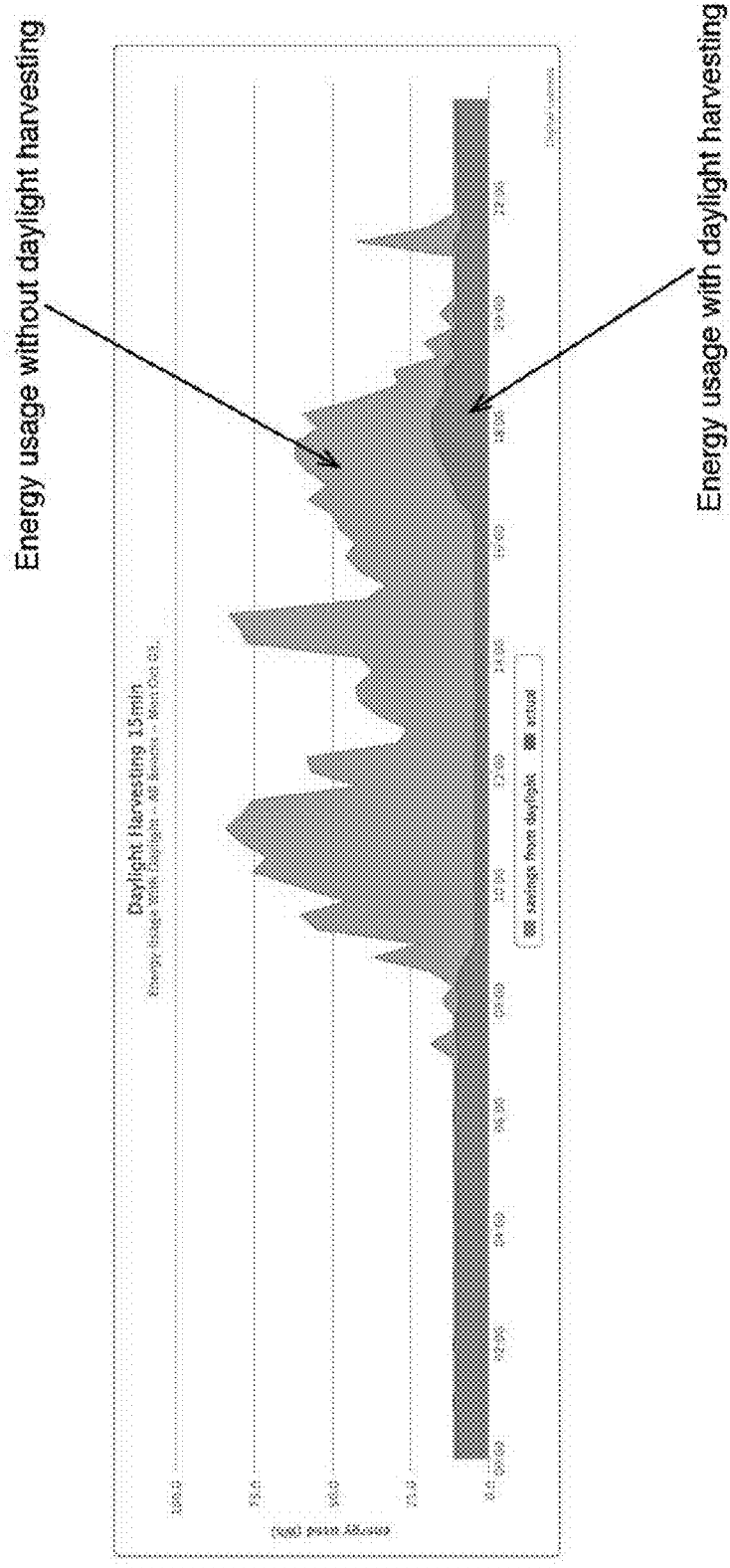
FIG. 8 is a plot that illustrates of energy consumption cost with and without daylight harvesting, according to one embodiment of the present invention.

FIG. 8 is a plot of energy used by an illustrative lighting fixture 100 in an exemplary environment versus time of day with and without daylight harvesting. Without daylight harvesting, energy consumption is relatively low at night and jumps dramatically during the day while the lighting fixture emit lights. With daylight harvesting, however, the lighting fixture energy consumption drops for most of the day. This is because the lighting fixture emits less light during the day than at night thanks to effective measurement and exploitation of daylight. The lighting fixture's energy consumption rises slightly above the nighttime level in the late afternoon and early evening, possibly due the earlier onset of dusk in early fall (October 3), when these data were collected. In the summer time (e.g., mid-July), the energy consumption may rise later in the evening as daylight hours lengthen, and in the winter (e.g., mid-January), the energy consumption may rise earlier in the evening as dusk sets in earlier.

Fault Detection and Protection with a Power Management Unit

An exemplary intelligent light fixture 100 may include an integrated power and energy measurement subsystem that provides a detailed record of power and energy usage over time. This power and energy usage may be further broken down by fixture subsystem or individual driver output channels. It may also represent power and energy usage for the fixture 100 as a whole. The power and energy management subsystem may also measure characteristics of the AC power input to the light fixture, including but not limited to: phase angle, noise on the AC line, or power factor. The power and energy management subsystem may log measurements in memory onboard the light fixture, or transmit measurements to a remote monitoring system via wired or wireless network.

Referring again to FIG. 1B, the integrated power and energy measurement subsystem includes a hardware power meter 150 that is coupled to the PMU 130 and receives alternating current (AC) power (e.g., 120 VAC at 60 Hz) from an AC power input 156. The hardware power meter 150 provides the processor 132 with metering data representing the amount and rates of power consumption as a function of time. A low-voltage power supply 152 coupled to the power meter 150 transforms the AC power 156a into low-voltage (e.g., 5V) direct-current (DC) power suitable for running the processor 132 and/or other low-voltage electrical components in the lighting fixture. A high-voltage power supply 154 coupled to the power meter 150 transforms the AC power 156b into high-voltage DC power suitable for running the LED driver 140 and the LED light bars 142. The low-voltage power supply 152 and/or the high-voltage power supply 154 may filter and/or otherwise condition the AC power as desired.

Alternatively, the lighting fixture 100 (and occupancy sensing unit 102) may draw power from an external DC power supply, such as a rechargeable battery. Such an embodiment may include one or more DC-DC power converters coupled to a DC power input and configured to step up or step down the DC power as desired or necessary for proper operation of the electronic components in the lighting fixture 100 (and occupancy sensing unit 102). For instance, the DC-DC power converter(s) may supply DC voltages suitable for logic operations (e.g., 5 VDC) and for powering electronic components (e.g., 12 VDC). In such embodiments, the power meter 150 may The processor 132 may use information derived from the power meter's measurements to identify various fault conditions and to protect the lighting fixture 100 and its components from some or all of these fault conditions. The power meter 150 may provide various power-related measurements to the microcontroller, including but not limited to: the input AC voltage or current waveforms, the current or voltage waveforms associated with energy storage capacitors, the output pulse duration of a buck or boost power conversion circuit, or the voltage across and current through a series-wired string of LEDs. For example, the power meter 150 may sample the AC waveform received from the AC power input 156 at a rate equal to or greater than the Nyquist frequency of the AC waveform (e.g., a sampling rate of 120 Hz or higher for 120 VAC at 60 Hz). The processor 132 may process these measurements to produce a calculated power measurement corresponding to each of several LED driver outputs, to an entire light fixture, or to any or all of several electrical subsystems within a fixture. The processor 132 may also log some or all of these samples in the memory 134 for later analysis, e.g., to determine energy usage, lighting fixture performance, component performance, and/or performance of the corresponding circuit in the AC power grid.

The processor 132 may also detect undesired fluctuations in the input voltage in real-time. The processor 132 may react to these fluctuations in such a way as to prevent permanent damage to the fixture's power controller circuit, LEDs, or other electrical subsystems. The processor 132 may also be configured to detect any of several possible failure modes for the one or more strings of output LEDs and safely react to the failure modes in a way that prevents permanent damage to the fixture's power controller circuit, LEDs, or other electrical subsystems.

For instance, the processor 132 may determine whether the AC waveform's amplitude exceeds or falls below a predetermined threshold or exhibits a predetermined pattern or profile. If the processor 132 senses that the AC waveform's amplitude is drifting towards or has drifted below a predetermined threshold (e.g., 60 Vpp), the processor 132 may determine that a brownout is occurring. In such a case, the processor 132 may reduce power consumption by high-voltage components, such as the LED light bars 120, so to prevent these components from drawing too much current as the input voltage falls. Similarly, if the processor 132 senses a sudden voltage spike, it may determine that a lightning strike has occurred and shunt power and/or turn off one or more components in the PMU 130 or lighting fixture 100. The processor 132 may also detect and respond to indications that one or more components within the PMU 130 or fixture 100 is malfunctioning.

Figure 9:
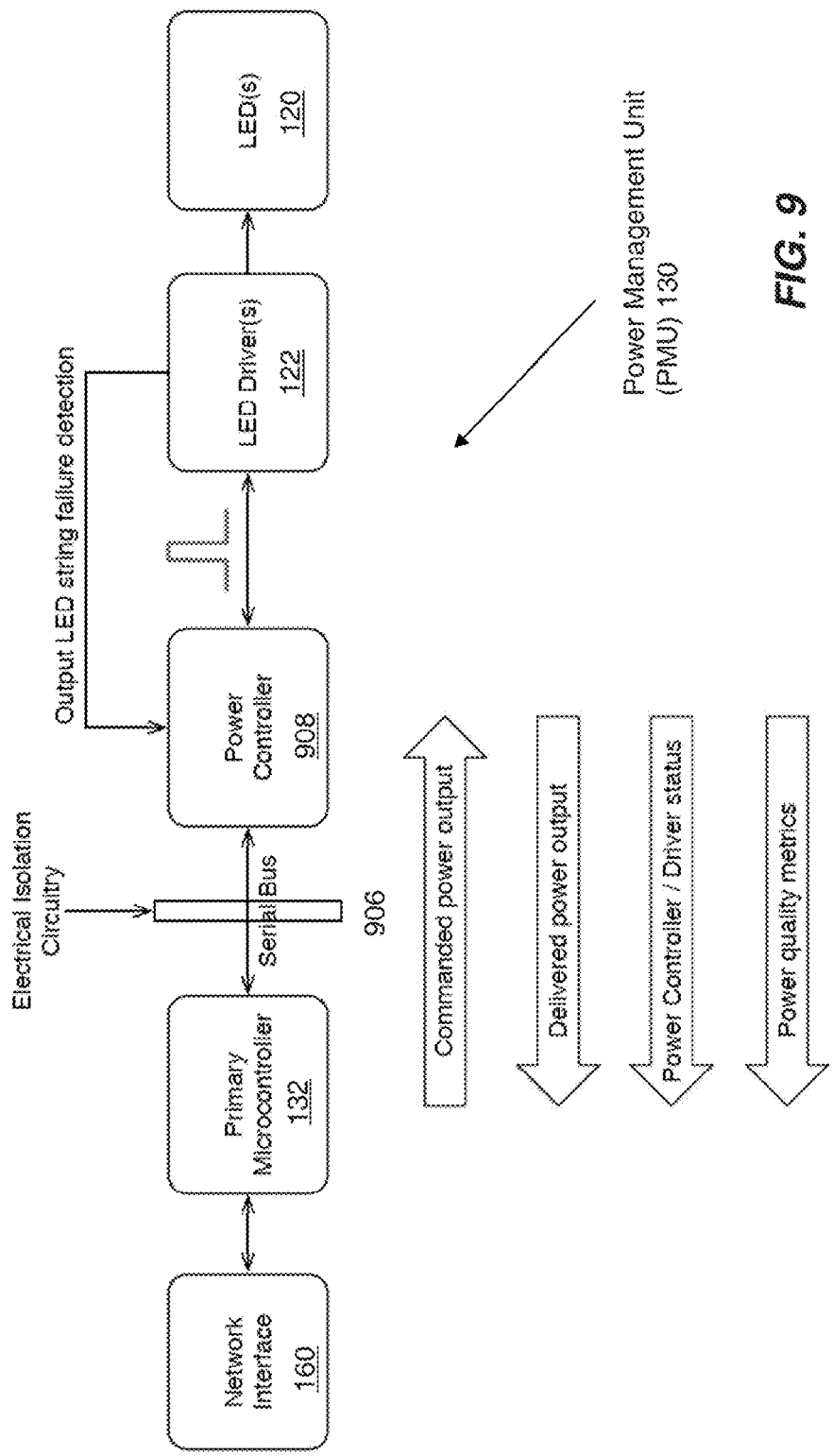
FIG. 9 is a diagram of a microcontroller-based power management unit configured to perform various power and energy measurement functions, according to one embodiment of the present invention.

FIG. 9 illustrates additional power control circuitry in an exemplary PMU 130. As described above, the PMU 130 includes a microcontroller (processor) 132, which can be used to implement the state machine 300 of FIG. 3, coupled to a power controller 908 via a serial bus 906 that isolates the processor 132 from the power controller 908. Upon receiving a new commanded power output (light output setting) from the microcontroller 904, the power controller 908 adjusts the current, pulse width modulation, voltage, etc. provided by one or more LED drivers 910 to the LED light bars 120. If one or more LEDs in the LED light bar 120 fails, the LED drivers 910 sends a failure detection signal to the power controller 910, which may adjust the settings of the working LEDs accordingly. The power controller 908 also provides indications of the delivered power output, power controller status, LED driver status, and power quality metrics to the processor 132.

Independent Power Management Units and Communications Interfaces

As shown in FIGS. 1B and 9, the lighting fixture 100 also includes a communications (network) interface 160 coupled to the processor 132. This interface 160 may be incorporated into the PMU 130 if desired. The communications interface 160, which is coupled to an antenna 162, provides the PMU 130 with access to a wireless communications network, such as a local area network or the Internet. The PMU 130 may transmit raw or processed occupancy data and/or ambient light data to a networked database, other lighting fixtures, or other occupancy sensing units via the communications interface 160. It may also receive occupancy data, ambient light data, firmware or software updates, predicted environmental data (e.g., temperature and ambient light level data), commissioning information, or any other suitable information from other sources, e.g., other lighting fixtures, occupancy sensing units, or external controllers.

The ambient light sensor 110 and the occupancy sensor 140 can also serve as receivers for modulated infrared data from remote control devices, infrared beacons, or other data transmitters. Light sensors may also serve as receivers for modulated infrared or visible light data. This data may be transmitted from a handheld device used in the sensor tuning process. This data may also be transmitted from an infrared or visible light beacon device attached to persons, vehicles, or other objects in the environment to facilitate tracking of these objects as they move within the environment.

Alternative embodiments of the PMU may physically be detached or separated from the lighting fixture. For instance, the PMU may be packaged and deployed in the environment as an independent unit that includes integrated sensors (e.g., ambient light level sensor and/or occupancy sensor) and a wired or wireless communications interface. Alternatively, or in addition, the PMU may be communicatively coupled to other PMUs, other light fixtures (including "dumb" light fixtures), and/or other independent sensors distributed throughout the environment. Such an independent PMU may detect ambient light levels and state parameter information from integrated sensors and/or from communicatively coupled sensors and process this data as described above. For instance, an independent PMU may be communicatively coupled to and control several lighting fixtures disposed to illuminate an environment. The PMU may also be retrofit to existing light fixtures, such as high-bay lighting fixtures common in many warehouses and cold-storage facilities.

Temperature-Based Intelligent Lighting

Inventive aspects of the temperature monitoring systems include, but are not limited to, light fixtures 100 with integrated sensors (e.g., temperature sensor 180 in FIG. 1B) to monitor the temperature of the air surrounding the fixture while filtering out temperature changes due to the operation of the fixture itself, remote temperature sensors designed to be integrated into an intelligent lighting system, and lighting control systems capable of monitoring, analyzing, and displaying data from a grid of temperature sensors.

An intelligent light fixture 100 may include one or more integrated temperature sensors 180 coupled to or integrated into its power management unit (PMU 130 in FIGS. 1A, 1B, and 9). These sensors may measure temperature inside and/or outside of the power management unit, including but not limited to: the operating temperature of specific electrical components, the ambient air temperature within a sealed portion of the fixture, the temperature of heat sinks or other thermal management devices, or the ambient air temperature outside of the fixture. When measuring ambient air temperature outside of the fixture, it may be desirable to disregard the change in ambient temperature attributable to the power dissipated by the fixture 100 itself. The intelligent lighting system (PMU 130) may combine data on fixture power consumption with ambient temperature readings in order to produce a more reliable and accurate ambient temperature reading.

In some cases, it may be desirable to monitor temperature in an environment at a location physically separated from any light fixture 100 deployed in the environment. In these cases, the temperature sensor may be contained in a remote module capable of communicating via a wireless or wired network with the PMU 130, lighting fixture 100, and/or other devices in an intelligent lighting system. The remote temperature sensor may be battery powered or may operate off of an AC or DC power connection.

The PMU 130 may record temperature data (e.g., from temperature sensor 180) in the memory 134 for real-time analysis and for post-processing and historical data analysis. The temperature data may be recorded in a database (e.g., local memory 134 or remote memory accessible via the communications interface 160), and may be annotated with the location where the reading was taken and the time at which it was taken. The temperature data may be analyzed to remove spurious readings, or to flag excessively high or low readings for further processing or response. The temperature data may be displayed as a time-based graph, or as a two-dimensional representation of the environmental layout with a temperature data overlay. Other building systems, including but not limited to HVAC units, chillers, blowers, and heaters, may be configured to act on real-time temperature data or alerts generated by an intelligent lighting system equipped with temperature sensors. Alternatively, the temperature data collected by the intelligent lighting system (PMU 130) may be exported in raw or processed form to control systems responsible for managing these other building systems for the other building system control systems to analyze. Based on temperature data it may also be possible to analyze and create visual representations of airflow patterns within a facility, allowing for optimized operation of HVAC and other related building systems.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A lighting fixture to illuminate an environment, the lighting fixture comprising:
   A) a memory to store a first transfer function mapping a first ambient light level at a first position within the environment to a corresponding second ambient light level at a second position within the environment, wherein the first position is at the lighting fixture and the second position is at a task height within the environment;
   B) an ambient light sensor located at the first position within the environment to measure an actual ambient light level at the first position within the environment;
   C) a processor, communicatively coupled to the memory and the ambient light sensor, to determine:
      C1) an expected ambient light level at the second position within the environment, based on the actual ambient light level measured at the first position within the environment and the first transfer function stored in the memory; and
      C2) a change in a light output of the lighting fixture to provide a desired ambient light level at the second position within the environment, based at least in part on the expected ambient light level at the second position within the environment; and
   D) at least one light source, communicatively coupled to the processor, to generate the change in the light output of the lighting fixture so as to provide the desired ambient light level at the second position within the environment.

2. The lighting fixture of claim 1, wherein the environment comprises at least one of:
   a warehouse,
   a cold-storage facility,
   an office space,
   a retail space,
   an educational facility,
   an entertainment venue,
   a sports venue,
   a transportation facility, and
   a correctional facility.

3. The lighting fixture of claim 1, wherein the memory is configured to store a plurality of transfer functions, including the first transfer function, mapping ambient light levels at the first position within the environment to corresponding ambient light levels at the second position within the environment, wherein each transfer function of the plurality of transfer functions corresponds to a different state of the environment, and wherein the lighting fixture further comprises at least one of:
   E) a communications interface to accept a user input selecting the first transfer function from among the plurality of transfer functions; and
   F) a state parameter sensor to provide a state parameter measurement used by the processor to select the first transfer function from among the plurality of transfer functions.

4. The lighting fixture of claim 3, further comprising:
G) a real-time clock, communicatively coupled to the processor, to provide a timing signal, wherein the processor is configured to select the first transfer function from among the plurality of transfer functions based at least in part on the timing signal.

5. The lighting fixture of claim 1, wherein the processor is configured to determine at least one of:
a portion of the actual ambient light level provided by the lighting fixture; and
a portion of the actual ambient light level provided by one or more light sources other than the lighting fixture.

6. The lighting fixture of claim 1, wherein the ambient light sensor is configured to sense a wavelength of at least one spectral component of the actual ambient light level, and
wherein the processor is further configured to determining a portion of the actual ambient light level based on the wavelength sensed by the ambient light sensor.

7. The lighting fixture of claim 1, wherein the processor is configured to control the at least one light source to generate the change in the light output of the lighting fixture so as to provide the desired ambient light level at the second position by adjusting at least one of:
an intensity of the light output;
a beam pattern of the light output;
a direction of the light output;
a color of the light output; and
a color temperature of the light output.

8. The lighting fixture of claim 1, further comprising:
H) an occupancy sensor, communicatively coupled to the processor, to sense a presence of at least one occupant within the environment and to provide an occupancy signal indicative of the at least one occupant,
wherein the processor is configured to select the desired ambient light level at the second position within the environment based at least in part on the occupancy signal.

9. The lighting fixture of claim 8, wherein the occupancy sensor is configured to sense at least one of:
a number of occupants within the environment;
a location of the at least one occupant within the environment; and
a motion of the at least one occupant within the environment.

10. The lighting fixture of claim 1, wherein the ambient light sensor is configured to measure a changed actual ambient light level at the first position after the change in the light output of the lighting fixture generated by the at least one light source, and
wherein the processor is configured to:
C3) determine a changed expected ambient light level at the second position based on the first transfer function stored in the memory and the changed actual ambient light level;
C4) determine a difference between the changed expected ambient light level and the desired ambient light level; and
C5) adjust the transfer function stored in the memory based on the difference between the changed expected ambient light level and the desired ambient light level.

11. A method of illuminating an environment with a lighting fixture, the method comprising:
A) storing, in a memory, a first transfer function mapping a first ambient light level at a first position within the environment to a corresponding second ambient light level at a second position within the environment, wherein the first position is at the lighting fixture and the second position is at a task height within the environment;
B) measuring, with an ambient light sensor located at the first position within the environment, an actual ambient light level at the first position within the environment;
C) determining an expected ambient light level at the second position within the environment, based at least in part on the first transfer function stored in A) and the actual ambient light level at the first position measured in B);
D) determining a change in a light output of the lighting fixture to provide a desired ambient light level at the second position within the environment, based at least in part on the expected ambient light level at the second position within the environment determined in C); and
E) causing the change in the light output of the lighting fixture determined in D) so as to provide the desired ambient light level at the second position within the environment.

12. The method of claim 11, wherein the environment comprises at least one of:
a warehouse,
a cold-storage facility,
an office space,
a retail space,
an educational facility,
an entertainment venue,
a sports venue,
a transportation facility, and
a correctional facility.

13. The method of claim 11, wherein A) comprises storing a plurality of transfer functions, including the first transfer function, mapping ambient light levels at the first position within the environment to corresponding ambient light levels at the second position within the environment, wherein each transfer function of the plurality of transfer functions corresponds to a different state of the environment, and wherein C) further comprises:
C1) selecting the first transfer function from among the plurality of transfer functions according to at least one of a user input and a measurement of a state of the environment.

14. The method of claim 13 wherein C1) comprises selecting the first transfer function from among the plurality of transfer functions based on at least in part on at least one of:
a time of day,
a day of the week, and
a day of the year.

15. The method of claim 11, wherein C) comprises:
C1) determining a portion of the actual ambient light level provided by the lighting fixture; and
C2) determining a portion of the actual ambient light level provided by one or more light sources other than the lighting fixture.

16. The method of claim 15, wherein B) comprises sensing a wavelength of at least one spectral component of the actual ambient light level, and
wherein at least one of C1) and C2) comprises determining the portion of the actual ambient light level based on the wavelength sensed in B).

17. The method of claim 11, wherein E) comprises changing at least one of:
an intensity of the light output;
a beam pattern of the light output;
a direction of the light output;
a color of the light output; and
a color temperature of the light output.

18. The method of claim 11, further comprising:
F) sensing, with an occupancy sensor, a presence of at least one occupant within the environment; and G) selecting the desired ambient light level at the second position within the environment based at least in part on the presence of the at least one occupant sensed in F).

19. The method of claim 18, wherein F) comprises sensing at least one of:
 a number of occupants within the environment,
 a location of the at least one occupant within the environment, and
 a motion of the at least one occupant within the environment.

20. The method of claim 11, further comprising:
H) measuring a changed actual ambient light level at the first position after the change in the light output of the lighting fixture caused in D);
I) determining a changed expected ambient light level at the second position based on the first transfer function stored in A) and the changed actual ambient light level at the first position measured in H);
J) determining a difference between the changed expected ambient light level determined in I) and the desired ambient light level at the second position; and
K) adjusting the transfer function stored in A) based on the difference determined in I).

21. A lighting fixture to illuminate an environment, the lighting fixture comprising:
 A) a memory to store at least one transfer function mapping a first ambient light level at a first position within the environment to a corresponding second ambient light level at a second position within the environment;
 B) an ambient light sensor located at the first position within the environment to perform a first measurement of an actual ambient light level at the first position within the environment and provide a first ambient light signal indicative of the first measurement;
 C) an occupancy sensor to sense a presence of at least one occupant at the second position within the environment and to provide an occupancy signal indicative of the presence of the at least one occupant;
 D) a processor, communicatively coupled to the memory, the ambient light sensor, and the occupancy sensor, to:
  D1) determine a first expected ambient light level at the second position within the environment, based on the first ambient light signal and the at least one transfer function stored in the memory; and
  D2) select a desired ambient light level at the second position within the environment, based at least in part on the occupancy signal; and
  D3) determine a change in a light output of the lighting fixture to provide the desired ambient light level at the second position within the environment, based at least in part on the first expected ambient light level and the desired ambient light level at the second position within the environment; and
 E) at least one light source to generate the change in the light output of the lighting fixture so as to provide the desired ambient light level at the second position,
 wherein the ambient light sensor is configured to perform a second measurement the actual ambient light level at the first position within the environment after the change in the light output of the lighting fixture generated by the at least one light source and to produce a second ambient light signal indicative of the second measurement, and
 wherein the processor is further configured to:
  D4) determine a second expected ambient light level at the second position within the environment based on the at least one transfer function stored in the memory and the second ambient light signal;
  D5) determine a difference between the second expected ambient light level and the desired ambient light level; and
  D6) adjust the at least one transfer function stored in the memory based on the difference between the second expected ambient light level and the desired ambient light level.

22. A method of illuminating an environment with a lighting fixture, the method comprising:
A) storing, in a memory, at least one transfer function mapping a first ambient light level at a first position within the environment to a corresponding second ambient light level at a second position within the environment;
B) measuring, with an ambient light sensor, a first actual ambient light level at the first position within the environment;
C) determining a first expected ambient light level at the second position within the environment based at least in part on the at least one transfer function stored in A) and the first ambient light level at the first position within the environment measured in B);
D) sensing, with an occupancy sensor, a presence of at least one occupant at the second position within the environment;
E) selecting a desired ambient light level at the second position within the environment based at least in part on the presence of the at least one occupant sensed in D);
F) determining a change in a light output of the lighting fixture to provide the desired ambient light level at the second position within the environment based at least in part on the first expected ambient light level at the second position determined in C) and the desired ambient light level at the second position selected in E);
G) causing the change in the light output of the lighting fixture determined in F) so as to provide the desired ambient light level at the second position;
H) measuring a second actual ambient light level at the first position within the environment after the change in the light output of lighting fixture illuminating the environment;
I) determining a second expected ambient light level at the second position within the environment based on the at least one transfer function stored in A) and the second actual ambient light level at the first position measured in H);
J) determining a difference between the second expected ambient light level at the second position determined in I) and the desired ambient light level at the second position selected in E); and
K) adjusting the at least one transfer function stored in A) based on the difference determined in I).

23. A sensing module comprising:
A) an ambient light sensor to generate an actual output representative of a change in a first ambient light level at a first position in an environment caused by a change in a light output of at least one light source illuminating the environment;
B) a memory to store at least one transfer function mapping a change in a second ambient light level at a second position in the environment to the corresponding actual output of the ambient light sensor at the first position in the environment;
C) a processor, communicatively coupled to the ambient light sensor and the memory, to:
 C1) determine an expected output of the ambient light sensor based on the at least one transfer function stored in the memory and a first change in the first ambient light level;

C2) determine a difference between a first actual output representative of the first change in the first ambient light level and the expected output; and
C3) adjust the at least one transfer function stored in the memory based on the difference between the first actual output and the expected output.

24. The sensing module of 23, further comprising:
D) a communications interface, communicatively coupled to the processor, to transmit a signal that causes the at least one light source to generate the change in the light output.

25. The sensing module of 23, wherein the processor is configured to log, in the memory, the actual output, the expected output, and the change in the light output of the at least one light source illuminating the environment.

26. A ballast interface for a light-emitting diode (LED) lighting fixture, the ballast interface comprising:
a power input to receive alternating current (AC) power;
an LED driver circuit, operatively coupled to the power input, to transform a first portion of the AC power to direct current (DC) power at a first voltage suitable for driving at least one LED in the LED lighting fixture;
a power meter, operatively coupled to the power input, to sense a waveform of the AC power;
a low-voltage power supply, operatively coupled to the power meter, to transform a second portion of the AC power into DC power at a second voltage lower than the first voltage; and
a power management unit, communicatively coupled to the power meter, to adjust the LED driver circuit in response to the waveform of the AC power.

27. The ballast interface of claim 26, wherein the power meter is configured to measure at least one of a phase angle, a power factor, and a noise level of the AC power.

28. The ballast interface of claim 26, wherein the power management unit is configured to determine a presence of at least one of a brownout and a lightning strike based on the waveform of the AC power.

29. The ballast interface of claim 26, wherein the power management unit is configured to limit a current drawn by the LED driver circuit to power the at least one LED in response to the waveform of the AC power.

30. The ballast interface of claim 26, further comprising:
a memory, communicatively coupled to at least one of the power meter and the power management unit, to store a representation of the waveform of the AC power.

31. A method of powering a light-emitting diode (LED) lighting fixture, the method comprising:
receiving alternating current (AC) power;
transforming a first portion of the AC power to direct current (DC) power at a first voltage suitable for driving at least one LED in the LED lighting fixture;
transforming a second portion of the AC power to DC power at a second voltage lower than the first voltage;
sensing a waveform of the AC power;
identifying at least one fault condition based at least in part on the waveform;
generating a digital signal based at least in part on the at least one fault; and
adjusting the LED driver circuit in response to the digital signal.

32. The method of claim 31, wherein sensing the waveform comprises measuring at least one of a phase angle, a power factor, and a noise level of the AC power.

33. The method of claim 31, wherein identifying the at least one fault condition comprises determining a presence of at least one of a brownout and a lightning strike based on the waveform.

34. The method of claim 31, wherein adjusting the LED driver comprises limiting a current drawn by the LED driver circuit to drive the at least one LED.

35. The method of claim 31, further comprising:
storing, in a memory, a representation of at least one of the waveform and the at least one fault.

* * * * *